Figure 1:
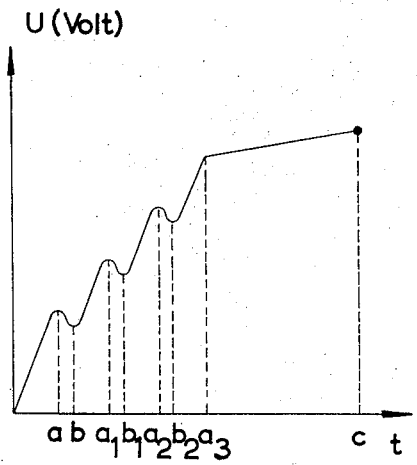

Aug. 23, 1960    G. HALFTER ET AL    2,950,178
APPARATUS FOR AUTOMATIC TITRATION
Filed Oct. 6, 1958    11 Sheets-Sheet 1

INVENTOR
George Halfter and Gerhard Koehler
BY
Mead, Browne, Schuyler & Beveridge
ATTORNEY

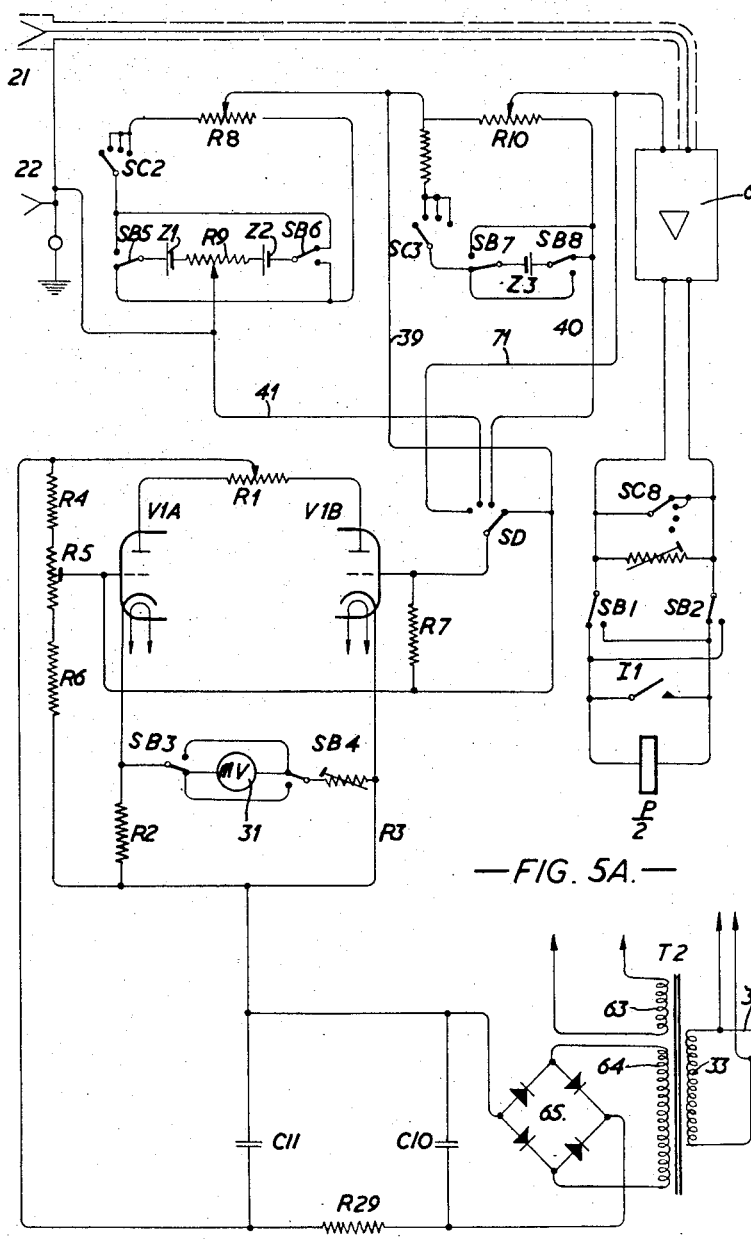
— FIG. 5A.—

Aug. 23, 1960 G. HALFTER ET AL 2,950,178
APPARATUS FOR AUTOMATIC TITRATION
Filed Oct. 6, 1958 11 Sheets-Sheet 5

INVENTOR
Georg Halfter and Gerhard Koehler
BY
Mead, Browne, Schuyler & Beveridge
ATTORNEY

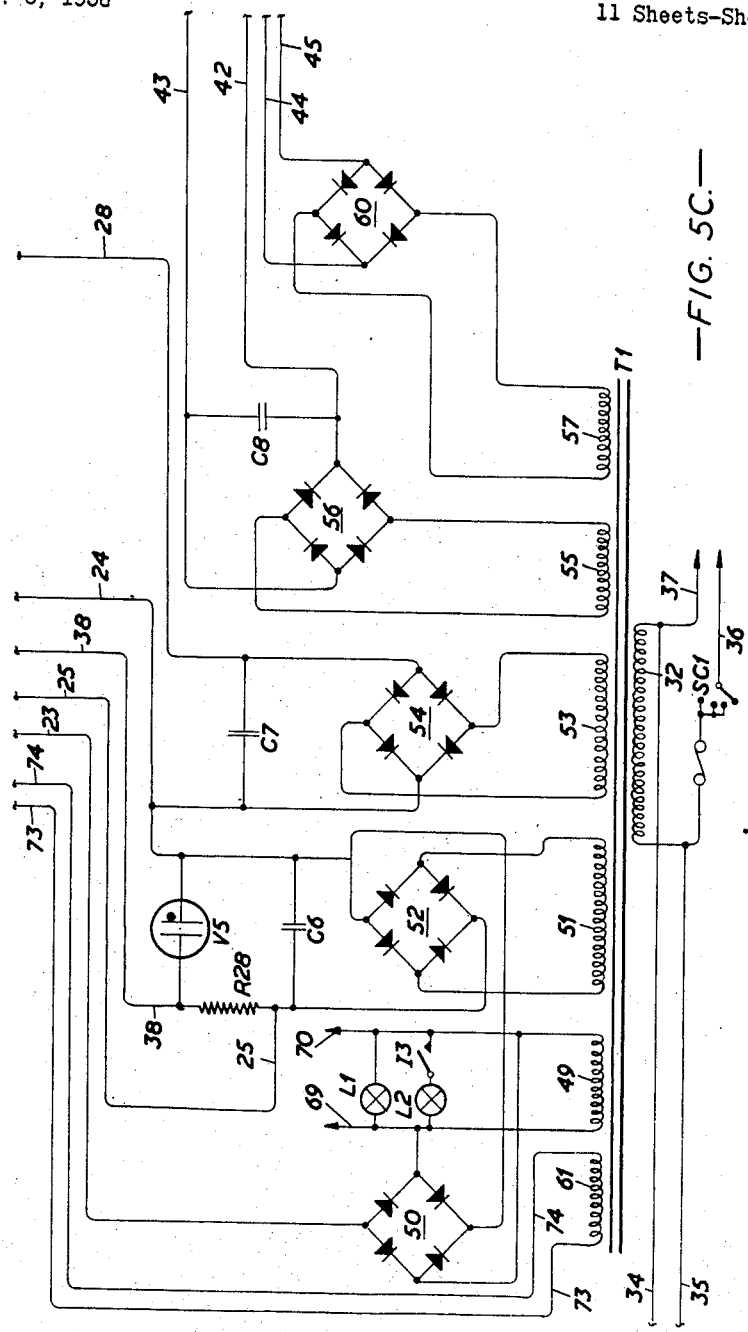

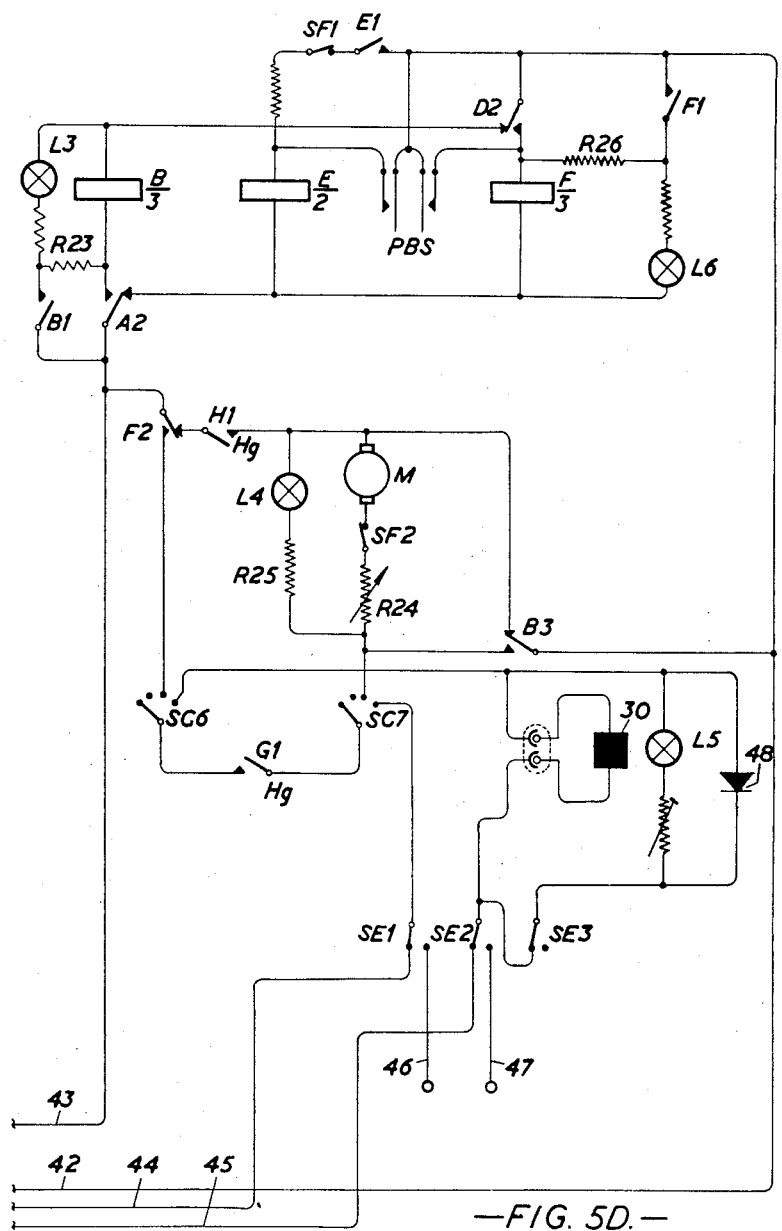
—FIG. 5D.—

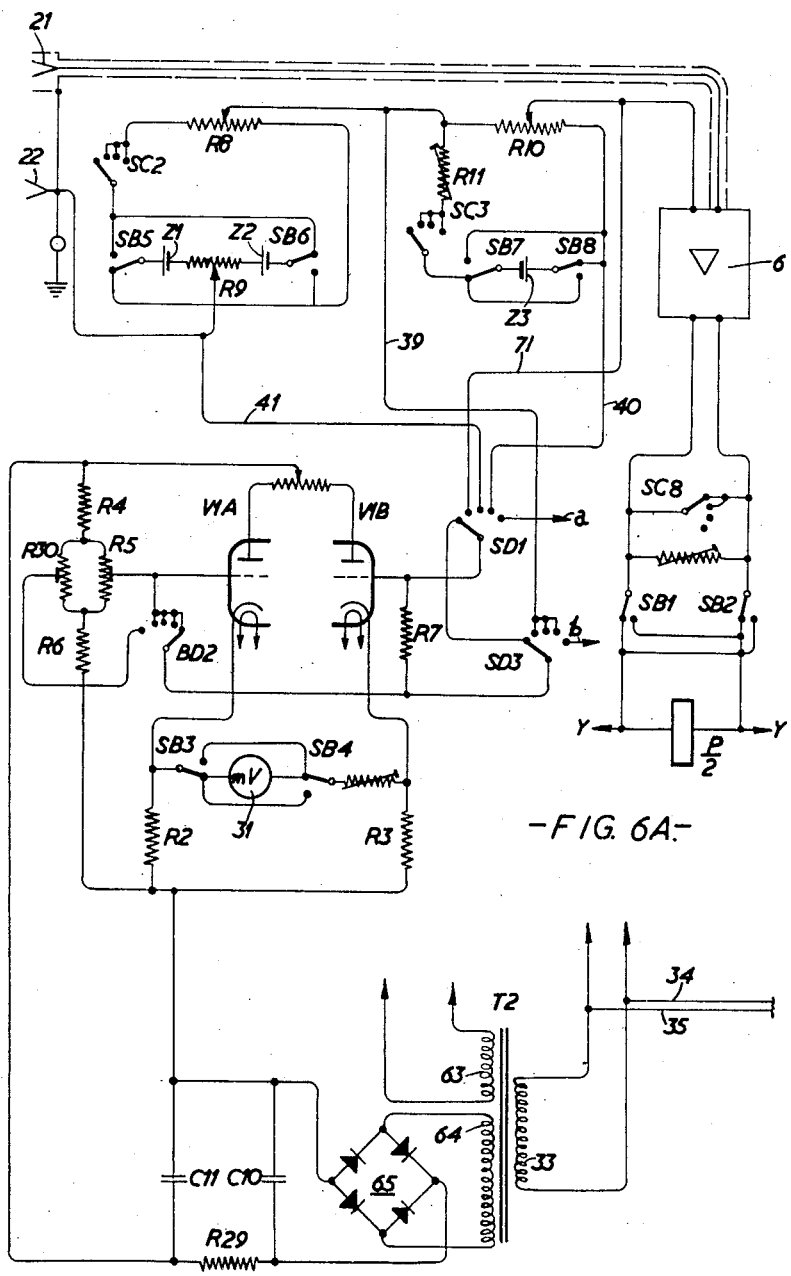

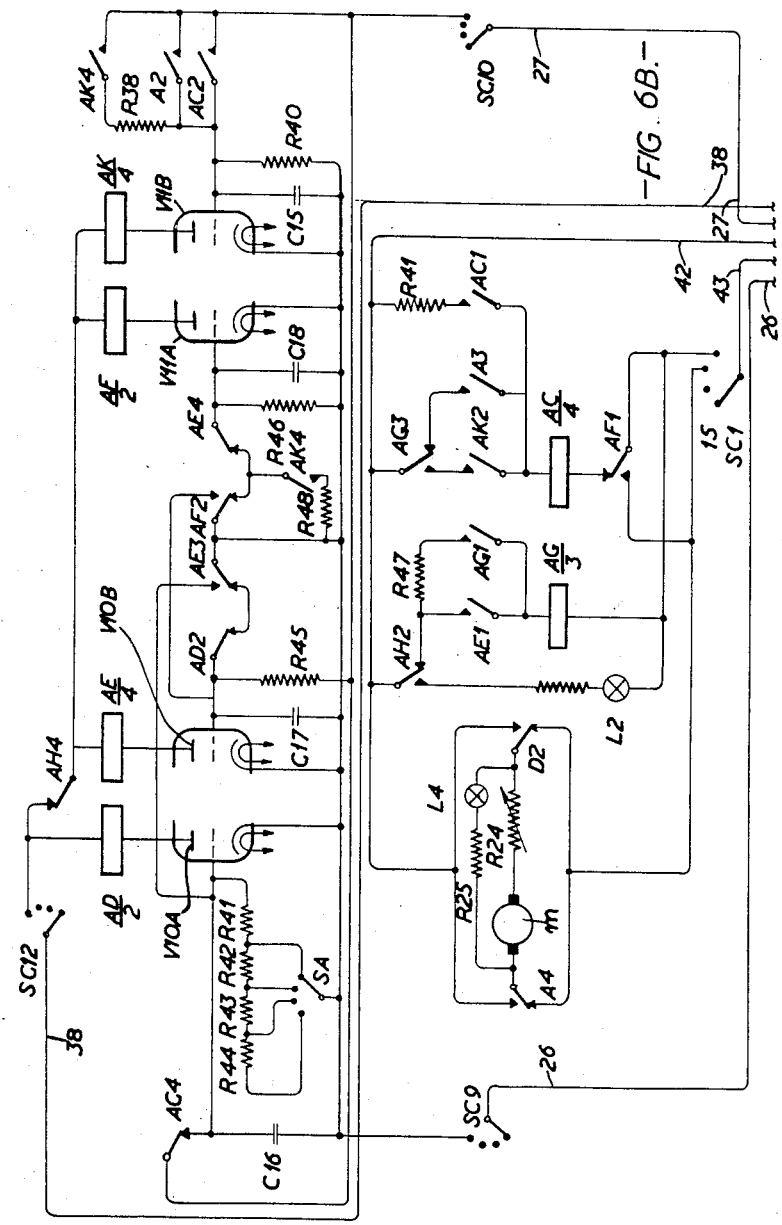

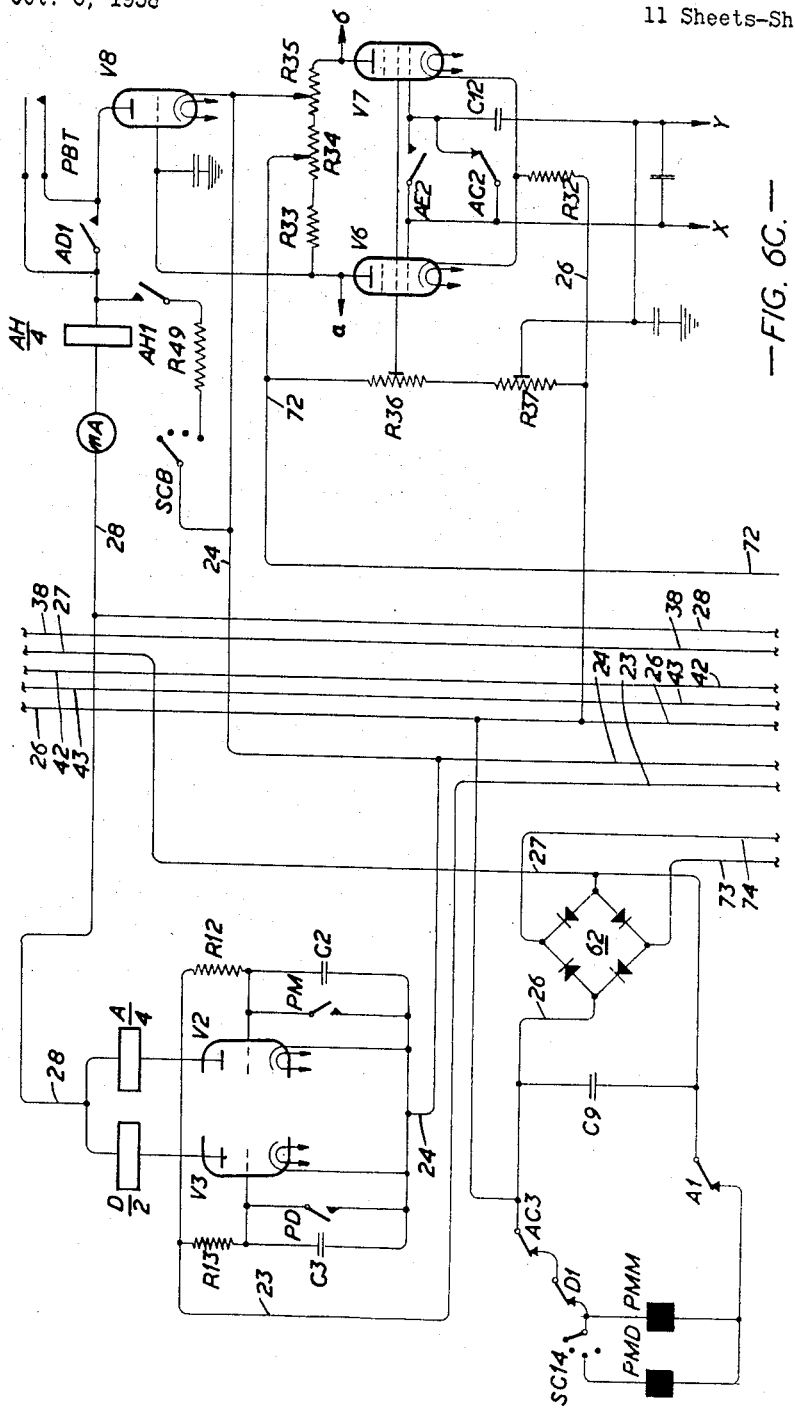

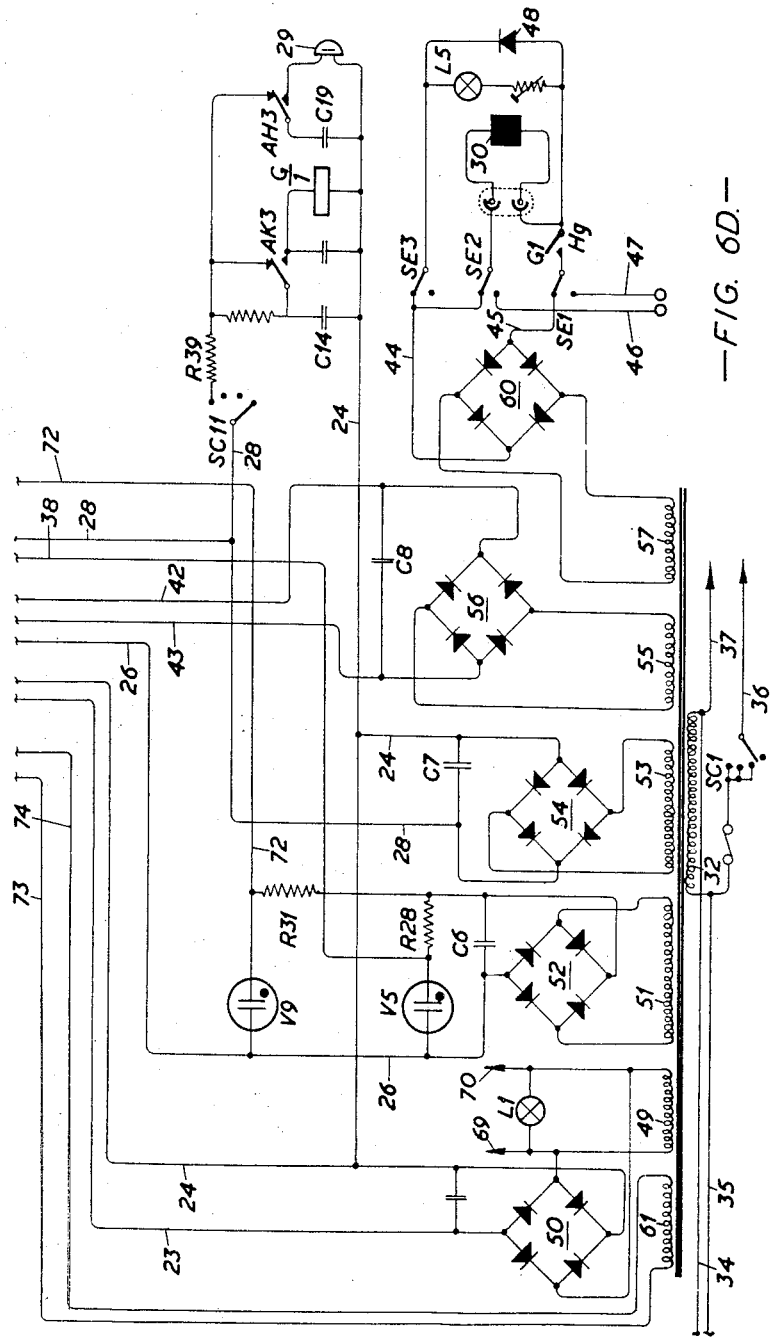
-FIG. 6D-

United States Patent Office 2,950,178
Patented Aug. 23, 1960

2,950,178
APPARATUS FOR AUTOMATIC TITRATION

Georg Halfter, Grenzach, and Gerhard Koehler, Lorch, Germany, assignors to J. R. Geigy A.-G., Basel, Switzerland Filed Oct. 6, 1958, Ser. No. 765,570
Claims priority, application Switzerland Oct. 9, 1957
9 Claims. (Cl. 23—253)

The present invention relates to apparatus and methods for automatic titration and includes a method of controlling chemical reactions.

In the field of potentiometric titrations, appliances are known which either use the known titration curve for a given system, or which respond to a pre-set potential corresponding to the end-point of the titration. In both these instances, the titration curve must be known before the appliance can be used.

An apparatus is also known which uses the point of reversal of the differential co-efficient of the potential at the electrodes for determining the end-point of the titration (Anal. Chem., vol. 26, 1954, No. 8, pp. 1348–1351).

These known appliances, however, all suffer from disadvantages of one kind or another. Thus, the result which they give may be affected by the asymmetry potential (e.g. in the case of glass electrodes), gradient deviations, alkali error and other similar deviations from the theoretical value. Again, in these known appliances, the titrating agent is added continuously and they are only useful for those potentiometric titrations in which the reaction occurs instantaneously. For systems in which the reactions do not occur instantaneously they do not give a correct end-point and cannot be used.

Little or no attention has been given in the past to redox titrations, the only potentiometric method which has been described being that of Mueller and Dachselt (Zeitschrift für Elektrochemie, 1925, vol. 31, pp. 662–666), for the titration of aromatic amines with sodium nitrate. This method is not automatic and involves manually measuring the potential at the electrodes twice after each portionwise addition of nitrite solution. The first measurement of potential is taken after an interval of one-quarter minute and the second measurement of potential after an interval of five minutes. Curves are plotted for the potential at the quarter minute and at the five minute intervals and the point of intersection of the curves gives the end-point of the titration. The method is thus both tedious and time-consuming.

It is an object of the present invention to provide a method and apparatus for automatic titration in both potentiometric and redox titrations which is free from the disadvantages of the above known systems. It is a further object of the present invention to provide a method and apparatus for automatic titration in both potentiometric and redox titrations which will give a consistent end-point irrespective of the reactants involved. It is a further object of the present invention to provide a method and apparatus for both potentiometric and redox systems which automatically adapts the speed of the titration to the reaction velocity of the reactants employed. A still further object of the present invention is to provide apparatus for automatic titration which is unaffected by asymmetry potential, gradient deviation, alkali error and other similar deviations from the theoretical value. Another object of the present invention is to provide a method for controlling the course of the chemical reaction in which the addition of one reagent to the other is adapted to the speed of the reaction of the system. It is also an object of the invention to provide a method of controlling chemical reactions in which the supply of one reactant to the other reactant is automatically cut off when the reaction is complete. Other and further objects of the invention will become apparent from the description which follows.

In the method of the present invention, the titration liquid is fed intermittently, the feed being positively interrupted in each case until the potential at the electrodes has reached equilibrium; thus the titration is always adapted automatically to the reaction speed of the system.

Figure 3:
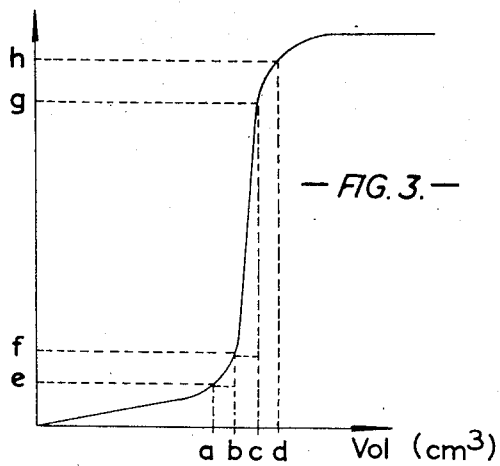
Figure 7:
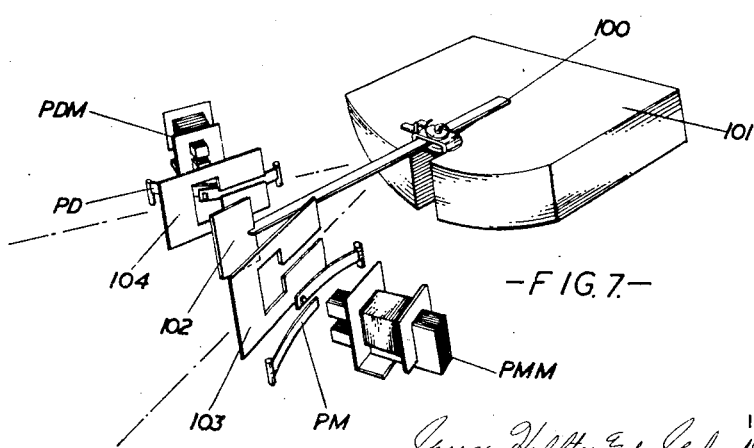
Figure 2:
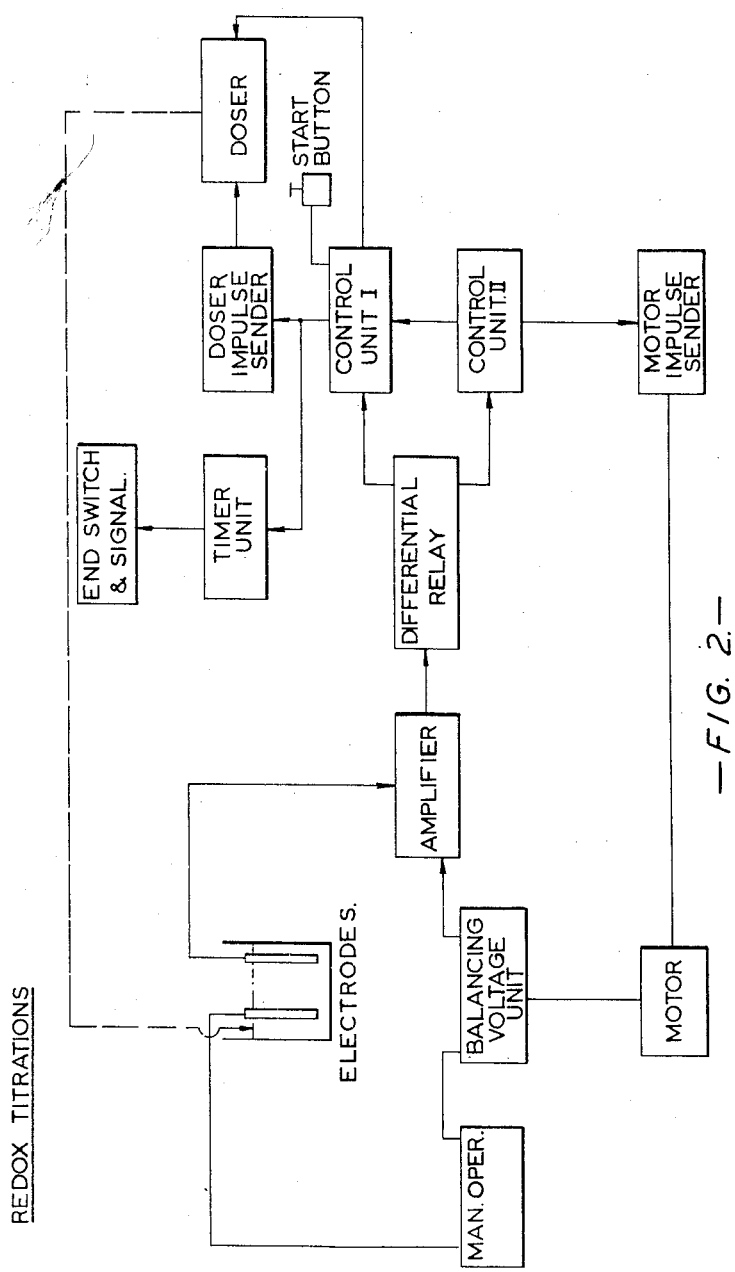
Figure 4:
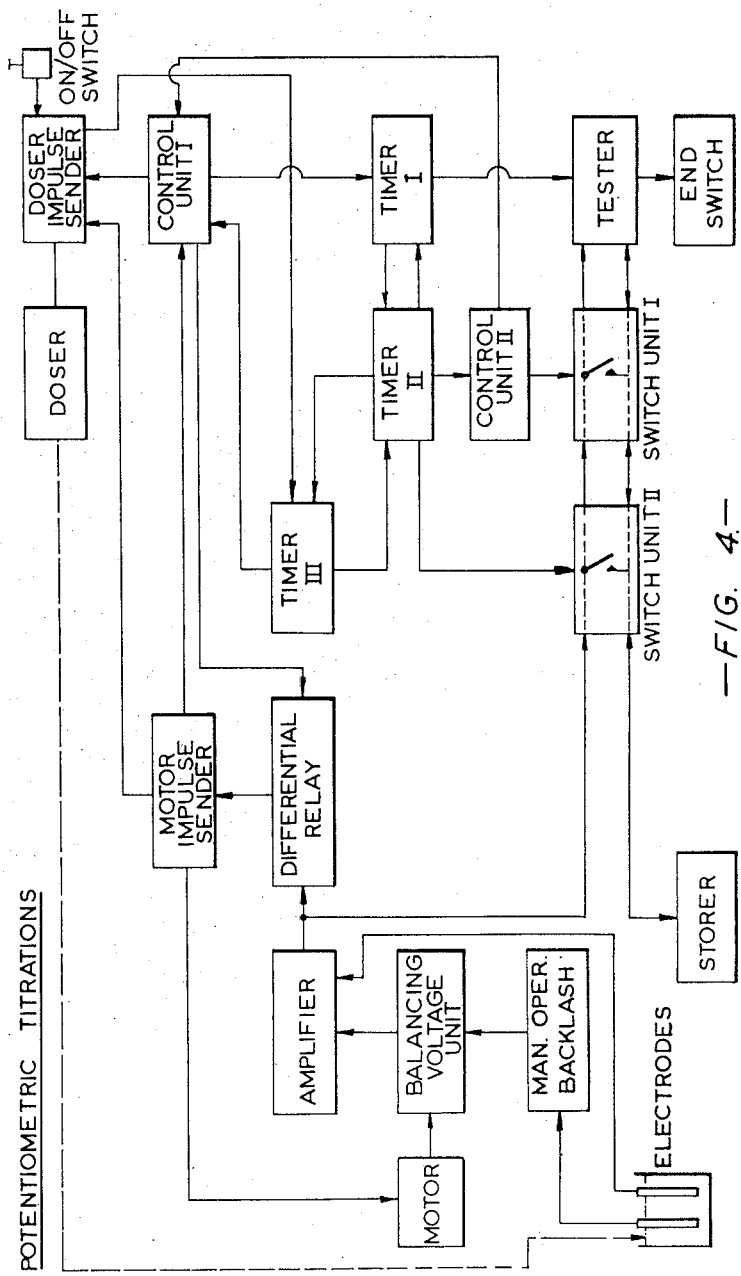

The invention will be further illustrated by reference to the accompanying drawings in which:

Fig. 1 is a graph showing the change in potential at the electrodes with time in a typical redox titration according to the invention, Fig. 2 is a block diagram illustrating an apparatus according to the invention for use in redox titrations, Fig. 3 is a graph showing the change in potential with volume of titration agent added in a typical potentiometric titration according to the invention, Fig. 4 is a block diagram illustrating an apparatus according to the invention for use in potentiometric titrations, Fig. 5A, B, C, D are a detailed circuit diagram of an apparatus according to the invention for use in redox titrations, Figs. 6A, B, C, D are a detailed circuit diagram of an apparatus according to the invention for use in potentiometric titrations, Fig. 7 is a diagrammatic illustration of the pantam relay used in the apparatus illustrated in Figs. 4 to 6.

Referring to Fig. 1 of the drawings, this curve illustrates the change in potential with time in a redox titration. The particular curve illustrated shows a rise in potential. It is equally possible, of course, to have a decrease in potential, in which case the curve would be the reverse of that shown in Fig. 1. For convenience, however, we shall describe the case where the potential of the system rises as the titration progresses.

On addition of a portion of one reagent to the other, a rise in potential will occur. The rise in potential, however, will not be instantaneous, and will take a definite time. If no other factors were active in the system, the potential would continue to rise until it reached a maximum value, and would then remain stable. In the redox systems, however, as soon as the one reagent is added to the other, a reaction between the two reagents starts. The reaction is not instantaneous, however, and again takes time to reach completion. The effect of the chemical reaction is to decrease the amount of the free added reagent in the reaction system. This will, of course, tend to decrease the potential at the electrodes since the rise in potential is due to the presence of the free added reagent in the system. At some point, the tendency to decrease the potential caused by the chemical reaction will equal, and then overcome the tendency for the potential to rise due to the addition of the portion of reagent and at this point the potential will stop rising and will begin to fall. This is the point indicated by $a$ in Fig. 1. If, after the potential has started to fall, a further portion of reagent is added, then the potential will again start to rise and the process will repeat itself until the reaction is complete. Thus, on the graph a further portion of reagent is added at the point indicated by $b$ when the potential rises again until a decrease is observed at $a_1$, when a further portion is added at point $b_1$ and so on to $a_2$ and $b_2$ along the curve. After the addition of the portion of reagent at $b_2$ the reaction within the system will be complete and accordingly there will no longer be a tendency for the potential to be reduced by a reduction in the amount of free added reagent within the system. The potential will therefore rise until it records its maximum value corresponding to the total amount of free added reagent remaining in the system and will thereafter remain substantially constant.

In the present invention, the reversal of potential change indicated by points $a$, $a_1$ etc. on the graph are utilised to effect the further addition of portions of reagent to the system and the absence of a fall in potential as indicated at point $a_3$ on the graph is used to indicate the end-point of the titration.

An apparatus for carrying this method into effect is illustrated diagrammatically in block diagram form in Fig. 2 of the drawings. In this apparatus, the electrodes are connected to an amplifier via a manually operated backlash potentiometer and a balancing voltage unit. The amplifier is in turn connected to a differential or moving coil relay, the differential relay in turn actuating two control units I and II. Control unit I controls the addition of reagent to the system and also controls the timer unit which indicates the end-point of the reaction and cuts off the supply of reagent. Control unit II actuates a motor via a motor impulse sender which actuates the balancing voltage unit to compensate the rise in potential which occurs at the electrodes. The manually operated backlash voltage is utilised to give a rough compensation for the potential which will exist across the electrodes before the titration begins.

In operation, control unit I first actuates the doser continuously so as to send a continuous stream of reactant into the system. The potential at the electrodes rises and this potential, amplified by the amplifier, actuates the differential relay which operates in a forward direction to send a series of pulses to control unit II. Control unit II cuts off control unit I which stops the supply of reactant from the doser. Control unit II also actuates a motor impulse sender which pulses the motor which in turn drives the balancing voltage unit which compensates the potential from the electrodes at the amplifier.

This compensation continues until the voltage reaches a maximum and starts to decrease. As soon as the potential at the electrodes decreases the differential relay ceases to pulse in a forward direction and sends a pulse in the reverse direction to control unit I which then operates a doser impulse sender which in turn actuates the doser to allow a single dose of reactant to enter the system. Simultaneously, the control unit I also initiates a timer unit, the function of which is described below.

The dose of reactant delivered by the doser causes the further increase in potential at the electrodes which again actuates the differential relay in the forward direction which sends a series of pulses to the control unit II which again actuates the motor impulse sender to drive the motor and hence the balancing voltage unit to compensate for the rise in potential at the electrodes.

The procedure then repeats itself, the timer being re-set at each operation of the doser unit until the stage is reached when the reaction is complete and the potential at the electrodes, after reaching the maximum, does not decrease. Because the potential does not decrease, the differential relay is not actuated in a forward direction, so that no further dose is added to the system. The timer unit which was initiated by control unit I at the same time as the last dose was added to the system continues to operate and after a predetermined time actuates the end-switch which cuts off the apparatus and also energises both visual and oral signals signifying the end of the titration.

Referring now to Fig. 3 of the drawings, the figure is a graph of the change in potential with volume of reagent added for a potentiometric titration according to the invention. As shown the graph shows a rising in potential at the electrodes, although it is equally possible to have a falling potential. For convenience we shall describe the case where the potential at the electrodes rises as the titration progresses.

On addition of the reagent to the system, the potential will rise slowly at first and then more rapidly as the titration nears the end-point. It will be observed that the first differential coefficient of the potential with respect to the volume of reagent added increases to a maximum and then falls away. This means that the second differential coefficient will be positive when the differential coefficient is rising, will pass through zero and will become negative when the differential coefficient reaches its maximum value and starts to decrease. In the method of the present invention, this change in the sign of the second differential coefficient is utilised to indicate the end-point of the reaction. Referring to Fig. 2, assuming that the volume of reagent is that indicated at $a$ then the potential will be $e$ as indicated. If now, a further portion of reagent is added so that the total volume of reagent added is $b$ as shown, then the potential will rise to the value $f$. The rise in potential caused by the addition of the portion of reagent will therefore be $(f-e)$ volts. Similarly, the addition of a further portion of reagent making the total volume added $c$ will effect a rise in potential to the value $g$. The addition of yet another portion of reagent increasing the total volume added to $d$ will effect a further rise in potential to the value $h$. The increases in potential by the addition of three equal portions of reagent will then be $(f-e)$ volts, $(g-f)$ volts and $(h-g)$ volts. It will be observed that in rising from the value $g$ to the value $h$ the curve passes through a point of inflection, i.e. the second differential coefficient of the potential with respect to the volume changes from positive to negative. The end-point of the titration is therefore between the points corresponding to potentials $g$ and $h$ on the curve. It will be observed further that the second rise in potential is greater than the first, but that the third rise in potential is less than the second. Subtracting the second from the first rise in potential will result in a negative figure, whilst subtracting the third from the second rise in potential will result in a positive integer. According to the present invention, this change in the sign of the difference between consecutive rises in potential is utilised to indicate the end-point of the reaction. In the method of the invention, the reagent is added portionwise and the consecutive rises in potential are compared automatically. When the magnitude of the last rise in potential is equal to or greater than the preceding rise, the apparatus will continue to add further quantities of reagent. As soon as the magnitude of the last rise is less than that of the preceding rise, the end-point of the titration is signalled, and no further portions of reagent are added.

A further feature of the present invention provides for a time delay between the addition of the reagent and the comparison of the consecutive rises in potential, in order that the potential at the electrodes shall have time to reach equilibrium before the comparison is effected. This time delay takes into account the reaction time of the electrodes and the rate of reaction in the system.

An apparatus for carrying this method of automatic potentiometric titration into effect is illustrated diagrammatically in block diagram form in Fig. 4 of the drawings. In the apparatus of Fig. 4 the manually operated backlash potentiometer, balancing voltage unit, amplifier, differential relay motor impulse sender and motor act in exactly the same way as described above in relation to the apparatus illustrated diagrammatically in Fig. 2 of the drawings. There is, however, one difference in that the differential relay is adapted to respond to signals in one direction only when the apparatus is actually titrating. The motor impulse sender is also adapted to control the doser impulse sender which operates the doser to add a quantity of reactant to the system, and also to operate a control unit I, which controls time circuits in timers I, II and III. The tester unit which tests each rise in potential and compares it with the previous rise is actuated by timer I and in turn actuates an end switch when the magnitude of the last potential rise indicates the end-point of the titration. The tester is connected via switch unit I and switch unit II to the amplifier on the one hand and to a storer unit on the other hand. Switch unit I is utilised to short out the tester in the initial stage of the titration and this switch unit is controlled by a control unit II. Switch unit II is controlled by timer II and functions to apply the necessary potentials to the tester and also to connect the storer unit with the amplifier when this is required during the titration.

In operation when the on/off switch is switched to the on position, it brings the doser impulse sender into operation which operates the doser unit to add a series of equal portions of reactant to the system. The addition of the reactant causes a rise in the potential at the electrodes which is then amplified in the amplifier and appears on the differential relay. As soon as this rise in potential is sufficient to operate the differential relay the motor impulse sender is actuated and cuts off the doser impulse sender which holds off the doser unit, so that no further reactant is added to the system. Simultaneously with cutting off the doser impulse sender the motor impulse sender also operates a control unit I which immediately disconnects contacts within the differential relay so as to render it inactive temporarily, and at the same time holds the doser impulse sender off. The control unit I also activates timer I. The timer I does not operate until a pre-set time has elapsed. This time delay is to ensure that the potential at the electrodes reaches equilibrium. The magnitude of the time delay depends on the setting of timer I. During this delay the potential at the output of the amplifier is being fed via switch unit II and switch unit I to the storer where it is stored. After the pre-set time delay has expired, timer I operates and actuates timer II. Simultaneously it also operates the tester but owing to the fact that switch unit I is in its closed position the tester is ineffective.

After a set time delay, timer II operates and cuts off timer I which releases the tester. Timer II also operates control unit II which holds itself in operation for the remainder of the titration and opens switch unit I. Control unit II also alters the circuit of control unit I to render it capable of being operated by release of timer III. Simultaneously with opening switch unit I, timer II closes switch unit II so as to keep the potential from the amplifier on the storage unit. When timer II operates it actuates timer III which after a predetermined time interval operates to cut off timer II. On release, timer II opens switch unit II to reconnect the amplifier voltage on to the tester unit. The potential in the storer which has now reached the potential of the amplifier is also applied to the tester. The tester is not, however, as yet operating, since timer I has been cut off.

Timer III cuts off the control unit I which on release renders the doser impulse sender and the differential relay capable of operation. The differential relay responds to the signal from the amplifier and causes the motor impulse sender to pulse. The pulses from the motor impulse sender operates the motor which in turn operates the balancing voltage unit to compensate for the electrode voltage at the input to the amplifier. Simultaneously with operating the motor, the motor impulse sender also renders the doser impulse sender inactive.

When the potential at the amplifier input has been fully compensated the differential relay no longer operates and therefore the motor impulse sender no longer pulses. The doser impulse sender is therefore no longer held off and eventually operates and in turn operates the doser unit to add a further portion of reactant to the system.

Operation of the doser impulse sender cuts off timer III which reactivates the control unit I which holds itself on and holds off the doser impulse sender thus preventing any further quantity of reagent entering the system, simultaneously the control unit I renders the differential relay ineffective.

The control unit I also actuates timer I. After the pre-set time delay during which the potential at the electrodes reaches equilibrium the timer I operates and simultaneously operates timer II and the tester. The voltage at the output of the amplifier is being fed via switch unit II and switch unit I to the tester and the voltage on the storer unit is also being fed via switch unit II and switch unit I to the tester. The voltage in the storer unit is equal to the previous rise in potential. The voltage at the output of the amplifier is the new rise in potential caused by the addition of one portion of the reagent. These voltages are compared by the tester and provided that the new voltage is greater than or equal to the stored voltage, the tester does not operate the end switch.

After a predetermined time interval timer II operates to cut off timer I which in turn cuts off the tester. Simultaneously it operates switch unit II to apply the new potential at the amplifier to the storage unit I which now stores the new potential. Timer II on operation also actuates timer III. After a predetermined time interval, timer III cuts off timer II which in turn cuts off switch unit II so as to remove the voltage at the amplifier to the storage unit. In doing so it re-applies the potential at the amplifier and the potential from the storer respectively to the tester which of course for the time being is inoperative. Timer III on operation also cuts off control unit I which now renders the differential relay operative, so that it responds to the voltage at the amplifier output. On release control unit I also brings the doser impulse sender into a condition for operation. The differential relay actuates the motor impulse sender which pulses the motor to operate the balancing voltage unit so as to compensate the electrode potential at the input to the amplifier. Simultaneously it holds off the doser impulse sender whilst compensation is being effected.

As soon as the compensation has been effected, the differential relay no longer operates and the motor impulse sender no longer holds off the doser impulse sender which therefore operates and in turn operates the doser unit which adds a further quantity of reagents to the system. The procedure then repeats itself until the stage is reached when the voltage applied to the tester from the amplifier is less than that applied to the tester from the storage unit. When this happens the tester operates the end-switch which cuts off the apparatus and signals the end-point of the titration.

A circuit diagram of one form of apparatus suitable for carrying out a redox titration is illustrated diagrammatically in Figs. 5A, 5B, 5C and 5D to which reference will now be made.

21, 22 (Fig. 5A) indicate the electrodes 1, 2 of Fig. 3. The manually adjustable backlash voltage unit 3 of Fig. 3 comprises batteries Z1 and Z2 and the potentiometers R8 and R9 (Fig. 5A). The balancing voltage unit 4 comprises the battery Z3 and the potentiometer R10 (Fig. 5A) which is mechanically driven by a motor M (Fig. 5D) which serves as the motor drive unit 8 of Fig. 3. The electrode 21 is connected to the slider of the potentiometer R9 and the slider of the potentiometer R8 is connected to one end of the motor driven potentiometer R10, the slider of which is connected to one input terminal of an amplifier 6 (Fig. 5A) the other terminal of which is connected to the electrode 21, so that the voltage applied to the input of the amplifier 6 is the algebraic sum of the potentials appearing between the electrodes 21, 22 across the manually adjustable backlash unit, and between one end and the slider of the motor operated potentiometer of the balancing voltage unit. The twin triodes V1A, V1B (Fig. 5A) and associated resistors comprise the valve volt meter 5 of Fig. 3 and the potentials appearing across the manually adjustable backlash unit, the balancing voltage unit or these two units combined can be selectively applied to a valve voltmeter by means of the selector switch SD. The output terminals of the amplifier 6 are applied to a circuit including the operating coil of a moving coil relay P, which serves as the direction sensitive relay 7 of Fig. 3, and includes normally open contacts PM, PD and operating magnets PMM and PMD in this relay, which is illustrated diagrammatically in greater detail in Fig. 7, a moving coil 100 is disposed in a magnetic field generated by magnet 101 and the application of a potential to the coil will effect displacement of the coil in one direction or the other from a central neutral position. Associated with the coil is an operating element 102 of magnetic material which within a centre range of movement is shielded by screens 103, 104 from the magnetic fields generated by the coils PMM and PMD. When the deflection of the coil brings the magnetic element outside this central range it is no longer shielded from the effect of one or other of the magnets which thereupon attract the operating element and the movement of the operating element under the attraction of such magnet effects closure of the contacts PM or PD according to the direction of displacement. The operating element is then retained by the magnet with the contacts closed until the magnet is de-energised irrespective of variations in potential subsequently applied to the coil. If, upon closure of contacts PM or PD the magnet associated with the contacts that are closed is de-energised the operating element is repelled mainly by the resiliency of the contacts, which thereupon open. If the potential applied to the coil is still sufficient to deflect the coil and the operating element beyond the central range and in the same direction upon re-energisation of the magnet the contacts will again be closed. Thus the relay can be used to develop a series of pulses when its coil is energised beyond a predetermined extent in either direction. A relay suitable for use in apparatus according to the present invention is marketed under the name "Pantam" by Gossen of Erlangen, Germany, and is known as type P.10 Rel V 1 a 1.

Referring now to Fig. 5A, the contacts PM and PD are connected in the grid circuits of two pentode tubes V2 and V3, in the anode circuits of which are connected the coils of relays A and D respectively. A negative bias sufficient to cut off valves V2 and V3 is applied through resistors R12 and R13 and lead 23 connected to one side of a source of potential, the other side of which is extended by lead 24 to the cathodes of valves V2 and V3. Condensers C2 and C3 are connected between the control grids and cathodes of valves V2 and V3 whose screen grids are connected to a source of positive potential extended between leads 25 and 24.

Figure 5B:
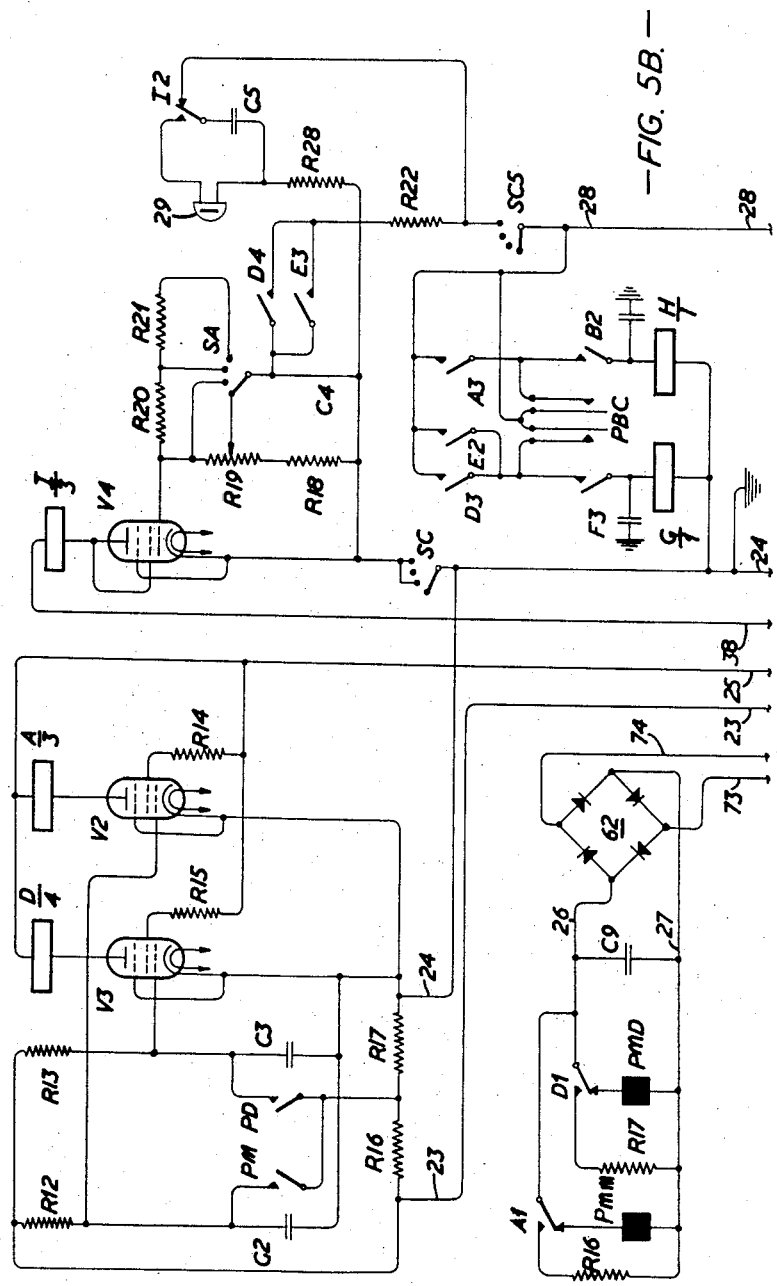

A source of direct current is extended by leads 26 and 27 to the magnet coils PMM and PMD through changeover contacts A1 of relay A and changeover contacts D1 of relay D respectively (Fig. 5B).

The timer unit 11 of Fig. 3 comprises a valve V4 (Fig. 5B) having a coil of relay I in its anode circuit and condenser C4, switch SA and resistors R18, R19, R20 and R21 in its control grid circuit. As will be subsequently described, by means of relay contact D3 and E3 and resistor R22 a negative voltage appearing on lead 28 relatively to lead 24 can be applied to the condenser C4 to cause valve V4 to cut off. The rate of discharge of condenser C4 subsequent to the opening of contacts D3 and E3 permits V4 to conduct after a predetermined time interval to bring about operation of relay I.

A bell 29 (Fig. 5B) serves as the indicator of the end switch with indicator unit 12 of Fig. 3.

30 (Fig. 5D) denotes the operating coil of the dosing device 10 of Fig. 3.

It will be appreciated that the direction of the potential or the potential change between the electrodes 21 and 22 during the progress of the reaction or titration may be in either direction; thus it may be in the direction indicated in the graph of Fig. 1, that is to say increasing in the positive direction, or it may be in the reverse sense, that is to say that it will increase in the negative direction. In order to cater for this a multipole switch SB is provided. Contacts SB1 and SB2 (Fig. 5A) reverse the connections between the operating coil of relay P and the output of the amplifier 6, contacts SB3 and SB4 (Fig. 5A) reverse the connections of millivolt meter 31 and the cathodes of the triodes V1A and V1B in the valve voltmeter, contacts SB5 and SB6 (Fig. 5A) reverse the connections between the batteries Z1 and Z2 and contacts SB7 and SB8 (Fig. 5A) reverse the connections of battery Z3.

A multipole switch SC serves as main control switch and it is believed that the operation of the apparatus can best be described by describing the operations which take place upon operation of this switch from one position to the next.

In Fig. 5 the contacts of switch SC are shown in the first or off position in which contacts SC1 (Fig. 5C) disconnect the primary winding 32 of a transformer T1, the primary winding 33 of a second transformer T2 and supply leads 34, 35 from leads 36, 37 extended to a source of an alternating current electricity supply (Figs. 5A and 5C). When switch SC is moved to its second or on position, contacts SC1 extend the alternating current supply to the primary windings of the transformers T1 and T2 and to the amplifier 6.

The heaters of the valves V1, V2, V3 and V4 are energised, pilot light L1 is illuminated to indicate that the apparatus is switched on. Switch contacts SC4 (Fig. 5B) extend a positive supply appearing between lines 24 and 38 to the anode and cathode circuit of the valve V4, which subsequently conducts to operate relay I since the negative bias which could be applied to its control grid is disconnected by switch SC5. Upon operation of relay I contacts 13 complete a circuit for indicator lamp L2 which serves to indicate that the apparatus is ready for use. The valve voltmeter can now be employed for adjustment of the backlash voltage unit and the voltage applied to the motor driven potentiometer R10. With switch SD (Fig. 5A) in the first position as shown, the control grid of valve V1A is connected to the control grid of valve V1B and the potentiometer R1 in the anode circuits of these valves can be adjusted to provide a zero deflection on the millivolt meter 31. By means of the potential dividers R4, R5 and R6 a pre-set voltage is applied to the control grid of the valve V1A and the potentiometer R5 of this potential divider is pre-set to provide on the control grid of valve V1A a potential corresponding to an input of 100 millivolts and the millivolt meter 31 is provided with an off-set zero scale so that subsequent to balance adjustment by means of the potentiometer R1 in the absence of an input signal to the control grid of valve V1B the millivolt meter would indicate electrical zero rather than mechanical zero. The control grid of the triode V1A is extended by lead 39 to the slider of potentiometer R8 and one end of the motor driven potentiometer R10. With switch SD in its second position the grid of the valve V1B is connected by lead 40 to the other end of the motor driven potentiometer R10 so that the full voltage available across this potentiometer is applied between the grid of valves V1A and V1B and across resistor R7 and can be measured by the valve voltmeter. This voltage may be controlled by adjustment of the pre-set variable resistor R11 in series with battery Z3, as this battery has been connected to the potentiometer R10 by switch contacts SC3. With switch SD in its third position the control grid of valve V1B is connected by lead 41 to the electrode 22 and the slider of resistor R9 so that the voltage applied between the grids of the valves V1A, V1B is the voltage between the sliders of potentiometers R9 and R8. These potentiometers are manually adjusted until the voltage existing between the sliders is, for example, 100 millivolts corresponding to the off-set zero of the millivolt meter 31. This will be indicated by deflection of the millivolt meter 31 of the valve voltmeter to its electrical zero position. The ohmic values of the potentiometers R8 and R9 are such that R8 serves as a coarse and R9 as a fine control. If switch SD is now moved into its fourth position the control grid of valve V1B is connected by lead 71 to the slider of the motor driven potentiometer R10 and the valve voltmeter may now be used to indicate the balancing voltage developed between one end of the slider and the potentiometer R10 as the reaction or titration proceeds.

The main control switch SC can now be switched to the third or preparatory position and the electrodes 21 and 22 inserted into the reaction vessel whereupon the apparatus will function to drive the motor driven potentiometer R10 until the voltage developed across it corresponds with the potential existing between the electrodes.

Moving the switch S3 into the third position serves to render valve V4 and relay I inoperative since contacts SC4 (Fig. 5B) disconnect the cathode of valve V4 from lead 24. The relay P is rendered inoperative since switch contacts SC8 (Fig. 5A) remove a short circuit from the amplifier 6 which is now applied through switch contacts SB1 and SB2 to the coil of this relay. Switch contacts SC6 and SC7 (Fig. 5D) connect contacts G1 of relay G into a circuit with the motor M.

Let it be assumed, for example, that the setting of the potentiometer R10, which is driven by the motor M, is such that the voltage developed across the potentiometer in series with the potential appearing across the electrodes 21 and 22 is less than the voltage appearing across the electrodes, so that a net positive input is applied to the input of the amplifier 6. The amplifier will deliver an output to the coil of relay P indicative that the potentiometer R10 must be driven in an increasing direction in order to produce a counterbalancing voltage to offset that existing between the electrodes. Contacts PM (Fig. 5A) of the relay P under the influence of the magnet PMM (Fig. 5B) close. Contacts PM apply a less negative bias to the control grid of valve V2, such potential being derived from the potential divider formed by resistors R16 and R17. Valve V2 now conducts and relay A4 operates. Contacts A1 disconnect the circuit to the magnet PMM which causes contacts PM of relay P to release. Release of contacts PM causes condensers C2 in the control grid circuit of valve V2 to charge to a more negative potential through R12 and after a short time delay valve V2 is biased back and relay A4 releases. The release of contacts A1 reconnect the magnet PMM and if a potential is still applied to the coil of relay P in the same direction contacts PM will close again and the cycle of conduction of valve V2 and operation of relay A will be repeated. Upon operation of relay A, control A2 (Fig. 5D) completes an operative circuit from a source of positive direct current potential appearing across leads 42 and 43 through contacts D4 to the operating coil of relay B. Relay B operates and contacts B1 complete a holding circuit for relay B through resistor R23. A pilot light L3 in parallel with the coil of relay B is illuminated. Contacts A3 (Fig. 5B) and contacts B2 complete a circuit from lead 28 to coil of relay H and lead 24. Contacts B3 (Fig. 5D) extend a circuit from lead 42 through a speed adjusting resistor R24 and switch contacts SF2 to one side of motor M. Operation of relay H completes a circuit through contacts H1 and contacts F3 to lead 43 to operate the motor M. The motor operates and drives the potentiometer R10 in a direction to increase the potential between the one end of the potentiometer and the slider and, since relay A3 is pulsing with the operation of the relay P as hereinbefore mentioned, the motor M through contacts H1 receives a series of impulses and drives the potentiometer R10 towards balance. As the voltage appearing at the potentiometer R10 approaches that between the electrodes 21 and 22 the magnitude of the output signal from the amplifier 6 will reduce and the rate or frequency at which the contacts PM close and relays A and H operate will be progressively reduced and as the balance point is reached insufficient output to operative relay P will be delivered by amplifier 6. In parallel with the motor M and in series with a resistor R25 is a pilot light L4 which will flash in accordance with the impulses delivered to the motor M and an indication that a preliminary balance point has been achieved will be given by the extinguishment of the lamp L4.

If, however, the setting of the slider of the potentiometer R10 is such that a greater voltage exists across that potentiometer and in series with the electrodes than the voltage appearing between the electrodes, the amplifier 6 will receive a signal in the opposite sense and will deliver an output to coil of relay P to deflect in the opposite direction. Closure of contacts PD (Fig. 5A) under the influence of the magnet PMD will cause a less negative bias to be applied to the control grid of valve V3 and relay D in the anode contact thereof to operate. Upon operation of relay D contacts D1 disconnect the magnet PMD which causes the contacts PD of relay P to release. The opening of contacts PD causes condenser C3 to be charged to a more negative voltage through resistor R13 and after a short time interval valve V3 is biased back and relay D releases. The release to relay D causes the re-energisation of magnet PMD through contacts D1 and if a similar potential is still applied to the coil of relay P contacts PD will close once more to reduce this bias on V3 and bring about the operation of relay D as before. This process will repeat until the potential applied to coil of relay P is insufficient to cause the closure of contacts PD. Upon operation of relay D contacts D2 complete a circuit from lead 42 through the coil of relay F and contacts A2 to lead 43. Relay F operates and contacts F1 provide a holding circuit for relay F through resistor R26.

Contacts D3 (Fig. 5B) prepare a circuit for the operation of relay G and contacts D4 are ineffective at this stage. Upon operation of relay F contacts F2 (Fig. 5D) prepare a circuit through switch contacts SD6 and SD7 and contacts B3 for the operation of the motor M. Contacts F3 complete a circuit for the operation of relay G which now pulses with the operation of relay D as hereinbefore described. Contacts G1 complete a circuit for the motor M to drive the motor in the reverse direction from that previously described so that the motor M now drives the slider of the potentiometer R10 in the opposite direction so as to reduce the series applied potential in the electrode circuit towards that required to balance the electrode potential. As the slider of the potentiometer R10 approaches the balance voltage position, the frequency of pulsing of relay P and hence the frequency of closing of contacts PD and of operation of relays D and G is reduced until the potential applied by amplifier 6 to relay P is insufficient to operate it. In like manner, lamp L4 (Fig. 5D) will pulse as the motor is energised and the extinguishment of the lamp L4 will indicate that balance has been achieved.

In both the foregoing cases it will be appreciated that the motor M is not continuously energized but actually receives a series of pulses whose repetition frequency diminishes as the potentiometer R10 is moved towards the balancing position. Under certain circumstances this procedure may be somewhat protracted and the potentiometer R10 may be operated to move it towards balance more quickly by operation manually of the push button PBC (Fig. 5B).

Upon operation of the push button PBC a circuit is extended from lead 28 to contacts B2 in series with the coil of relay H and to contacts F3 in series with the coil of relay G that both or either of relays G and H can be operated independently of the pulsing of contacts D3 or A3. If initially the setting of the slider of the potentiometer R10 is such as to give a voltage less than the balance voltage, relay P will operate as hereinbefore described to close contacts PM, cause valve V2 to conduct and relay A to operate, and upon operation of relay A contacts A2 (Fig. 5D) will complete a circuit for the operation of relay B. Contacts B3 as before prepare a circuit for the operation of the motor M in the required direction and contacts B2 complete a circuit for the operation of relay H, whereupon contacts H1 complete the operate circuit of the motor M and the slider of the potentiometer R10 is driven in the required direction towards balance. When balance is achieved the motor will not be stopped as relay B is still operated and the potentiometer slider will pass the balance point so that a reverse direction potential will be applied to the coil of relay P to bring about the closure of contacts PD, the reduction of bias on valve V3 and operation of relay D. The operation of relay D through contacts D2 (Fig. 5D) disconnect the circuit of relay B, which will release and complete an operate circuit for relay F. Upon operation of relay F contacts F2 through switch contacts SC6 and SC7 and relay contacts B3 (Fig. 5D) prepare a circuit for the operation of the motor in the reverse direction, and contacts F3 (Fig. 5B) complete a circuit for the operation of relay G, whilst upon release of relay B contacts B2 disconnect and release relay H. Contacts G1 (Fig. 5D) complete a circuit for operation of the motor in the reverse direction. If initially the setting of the slider of the potentiometer R10 is such that a voltage exists at the slider greater than that required to produce balance, initially the coil of relay P will be energised in the direction to bring about operation of contacts PD, to reduce the bias on valve 3 and cause operation of relay D (Fig. 5A). Relay D through contacts D2 (Fig. 5D) provides a circuit for the operation of relay F. Contacts F2 provide a circuit for the operation of motor M whilst contacts F3 complete a circuit for the operation of relay G. The motor will then be energised in a direction to drive the slider of the potentiometer R10 towards the balance position. In like manner the slider will be moved beyond the balance position and the coil of relay P energised in the reverse direction to cause operation of contacts PM and reduction of bias on valve V2 and operation of relay A. Upon operation of relay A, contacts A2 disconnect the circuit through relay F, which releases, and complete a circuit for relay B which operates. Release of contacts F2 and operation of contacts B3 prepare a circuit for the operation of motor M (Fig. 5D) in the reverse direction, whilst closure of contacts B2 (Fig. 5B) provide a circuit for the operation of relay H and contacts H1 complete the circuit for the motor M. Thus, if the push button PBC is operated the motor M will be energised to drive the slider of the potentiometer R10 towards and beyond the balance position and the slider will be oscillated by the motor M about the balancing position until the push button PBC is released whereupon the operation of relays G and H becomes dependent upon the operation of relays D and A respectively to bring about the movement of the slider of the potentiometer R10 to the balance position.

From the foregoing description it will be appreciated that the input to the amplifier 6 may change in polarity during the initial balancing process and thus the amplifier must be capable of responding to such changes and providing an output signal which also changes in polarity. Whilst a conventional direct current amplifier may be used a standing bias would need to be applied to the input signal in order to allow for the change in polarity, of the input signal and a corresponding bias would need to be separated from the output signal in order to compensate for the bias on the input signal and this would not be entirely satisfactory in practice owing to the possibility of zero drift in the amplifier. In practice a satisfactory performance can be obtained with an amplifier of conventional design incorporating a converter input circuit embodying a vibrator whereby a direct current input signal is converted into an alternating signal before being passed to the first stage of the amplifier. The output of the last stage of the amplifier is supplied to an inverter stage operating synchronously and in phase with the vibrator in the converter to deliver a direct current output signal. The delivered output signal can change polarity with a change of polarity of the input signal. Moreover, with such an amplifier it is found that there is substantially little zero drift, and if the amplifying stages embody conventional negative feed back a high stability can be obtained. It is believed that such an amplifier will be well known to those skilled in the art as to render further detailed description thereof unnecessary. By way of example a suitable amplifier for use in apparatus according to the present invention is marketed by Dipl. Ing. U. Knick of Nikolasse, Berlin, as Type 5c.

When the slider of the potentiometer R10 has been moved to the balance position as indicated by the extinguishment of the lamp L4 the switch SC may be turned to the off position and the reaction or titration performed.

The conditions are such that the potentiometer R10 has been adjusted to correspond to the potential between the electrodes. With movement of the switch SC into the fourth position switch contacts SC4 (Fig. 5B) connect the cathode of valve V4 to lead 24 to render that valve operative and contacts SC5 extend a negative bias voltage appearing between leads 24 and 28 through resistor R22 to contacts D4 and E4 in preparation for the operation of V4 as a timer. Contacts SC6 and SC7 (Fig. 5D) disconnect relay contacts G1 from the circuit of motor M and insert them in series circuit with the operating coil 30 of a dosing device which may derive its supply from leads 44 and 45 or, upon operation of switch SE having contacts SE1, SE2 and SE3, from an external supply connected to leads 46, 47.

The reaction or titration may be commenced by manual operation of the push button PBS (Fig. 5D) which extends a circuit from lead 42 to the coils of relays E and F and then through relay contacts A2 to lead 43. Upon operation of relay E contacts E1 complete a holding circuit for relay E through resistor R37 and switch contacts SF1. Contacts E2 (Fig. 5B) prepare a circuit for the operation of relay G, and contacts D4 apply a negative bias voltage to the control grid of valve V4 and to condenser C4 in its grid circuit to bias back that valve and obviate the operation of relay I. Upon operation of relay F (Fig. 5D) contacts F1 complete a holding circuit for relay F through resistor R26. Contacts F2 are inoperative at this stage and contacts F3 (Fig. 5B) complete a circuit for the operation of relay G. Upon operation of relay G contacts G1 (Fig. 5D) complete a circuit for the operation of the magnet 30 of the dose unit.

Upon energisation of the magnet 30 a quantity of titrating agent or reagent is permitted to flow into the reaction vessel in which the electrodes 21 and 22 are inserted. When the potential between the electrodes 21 and 22 (Fig. 5A) rises a signal is applied to the input terminals of the amplifier 6 and the output of the amplifier energises the coil of relay P in a direction to cause the contacts PM to close under the influence of magnets PMM. The closing of contacts PM as hereinbefore described brings about the operation of relay A and the pulsing of the contacts PM and relay A takes place until insufficient potential is applied to relay P. Upon operation of relay A contacts A2 (Fig. 5D) disconnect the operate and holding circuits of relays E and F and complete a circuit for the operation of relay B. The release of relays E and F disconnect the circuit of relay G which can no longer operate. Contacts G1 remain open disconnecting the magnet 30 of the dosing unit so that the introduction of titrating agent or reactant to the reaction vessel ceases.

Upon release of relay F and operation of relay B contacts F2 (Fig. 5D) and B3 prepare a circuit for the operation of the motor M, and contacts B2 (Fig. 5B) prepare a circuit for the operation of relay H. The circuit to relay H is completed through contacts A3 which as hereinbefore explained pulse. The repeated operation of relay H through contacts H1 (Fig. 5D) completes a pulsing circuit to the motor M to drive the slider of the potentiometer R10 in a direction to increase the voltage in series applied in the electrode circuit and the pulse energisation of motor M is repeated until the potential applied to the operating coil of relay P is insufficient thereby indicating that the potentiometer R10 has been adjusted to compensate for the rise in voltage appearing between the electrodes. When relay E was released contacts E3 disconnect the bias supply extended from lead 28 to condenser C4 in the grid circuit of valve V4 acting as timer. Condenser C4 proceeds to discharge through collectively resistor R19 and R18 or through resistor R20 and resistors R19 and R18 or through resistors R21, R20, R19 and R18 dependent upon the position of switch SA. After the rise of potential between the electrodes has been compensated by operation of the potentiometer R10 there may be a drop in the potential between the electrodes. Upon a drop in potential taking place a signal is delivered by the amplifier 6 to the coil or relay P in the reverse direction and if such drop occurs before operation of relay I in the timer, contacts PD are closed to reduce the bias on valve 3, and cause operation of relay D (Fig. 5A) as hereinafter explained. Upon operation of relay D contacts D4 (Fig. 5B) re-apply the bias voltage from lead 28 to condenser C4 and thus lock valve V4 to prevent the operation of relay I. Contacts D2 (Fig. 5D) disconnect the operate and holding circuits of relay B but restore the operate circuit of relay F which thereupon operates and holds through contacts F1.

Upon operation of relay F contacts F3 (Fig. 5B) prepare a circuit for the operation of relay G and contacts D3 complete this circuit so that relay G operates and contacts G1 (Fig. 5D) complete the circuit for the energisation of the magnet 30 of the dosing unit and a further drop of reagent or titrant is added to the reaction vessel. The addition of the reagent or titrating agent causes a rise in potential between the electrodes 21 and 22 so that a signal is delivered by the amplifier 6 to the coil of relay P in the former direction to bring about the operation of contacts PM as hereinbefore described. The sequence of operations is repeated, that is to say, that the motor M is energised to drive the potentiometer R10 to restore balance, the motor being driven by a series of pulses until relay P is no longer energised sufficient to close contacts PM.

If, within a given time interval, there is subsequently to the potentiometer R10 being moved to restore balance a drop in potention at the electrodes relay P will operate to close contacts PD and bring about the operation of relays D and F and G to cause a further drop of reagent or titrating agent to be added to the reaction vessel. When the end-point is reached there will be no drop in potential and the timing circuit of valve V4 is operative to detect this. It will be noted that, after release of relay E when the first rise in electrode potential occurs, the condenser C4 in the grid circuit of valve V4 only receives a negative charge when contacts D4 are closed. Operation of relay D is dependent upon the closing of contacts PD of the relay P which occurs only when a drop in potential between the electrodes 21 and 22 occurs. If no drop in potential occurs subsequent to the balancing of the potentiometer R10 to the electrode voltage condenser C4 with discharge through the resistors selected by the switch SA and after a time interval determined thereby valve V4 will conduct sufficiently to cause relay I to operate. Upon operation of relay I contacts I1 (Fig. 5A) short-circuit the operating coil of relay P to render it inoperative thereafter. Contacts I2 (Fig. 5B) connect a condenser C5, which has been connected between leads 28 through switch contacts SC5, a resistor R28 and switch contacts SC4 to lead 24, to the bell 29 which thereupon gives an audible alarm. Contacts I3 (Fig. 5C) complete a circuit for the pilot light L2 indicating that the end-point has been reached.

It will be noted that upon operation relay I will hold and remain operated until switch SC3 (Fig. 5B) is operated to the third position preparatory to carrying out a further titration thereby disconnecting the cathode of the valve V4 from lead 24 or until either relay D or relay E is operated to apply the bias to contacts D4 or E3 to condenser C4. Since, however, the operation of the relay D is dependent upon the operation of relay P to close contacts PD it will be appreciated that the release of relay I by operation of relay D is not possible.

For the carrying out of a subsequent reaction or titration the switch SC must be restored to third position and the same procedure as hereinbefore described follows. If, however, it is desired to carry out a series of repeat titrations with the same reagents under similar conditions and to the same end-point it is possible to maintain the potentiometer R10 in the setting corresponding to the initial end-point and this may be achieved by manual operation of switch SF. Contacts SF1 (Fig. 5D) disconnect the holding circuit for relay E and contacts SF2 disconnect the motor M. Upon starting a repeat titration, with switch SF operated, the push button PBS is operated and completes a circuit as hereinbefore described for the operation of relays E and F. Relay E will be unable to hold when push button PBS is released, but whilst it is operated contacts E3 will re-apply the bias to condenser C4 and to valve V4 to release relay I. Contacts I1 will open and enable the output of the amplifier 6 to be applied to the coil of relay P. As the potentiometer R10 is adjusted to a position corresponding to the end-point of the previous titration, the voltage applied in series in the electrode circuit by the potentiometer R10 will be greater than the potential existing between the electrodes 21 and 22 so that the signal applied to the input of amplifier 6 will be such as to cause the coil of relay P to be energised in a direction to cause contacts PD (Fig. 5A) to close, thereby causing the bias on the grid of valve V3 to be reduced and relay D to operate. The operation of relay D through contacts D2 (Fig. 5D) provide an alternative hold circuit for relay F and contacts D3 (Fig. 5B) in series with contacts F3 complete the circuit to relay G. In synchronism with the operation of relay D contacts G1 (Fig. 5D) close to energise the magnet 30 of the dosing unit and provide for the introduction of a series of doses drop by drop until the potential at the electrodes rises to a point corresponding to the end-point of the previous titration. When the end-point is reached there will be no subsequent drop in the potential at the electrodes 21 and 22 and no subsequent signal will be applied to the input of the amplifier 6 to cause the further closure of contacts PD. Relay D will not subsequently re-operate and condenser C4 in the grid circuit of valve V4 will discharge, after the appropriate time interval, relay I3 will operate to denote that the end-point has been achieved as hereinbefore described.

With regard to the timing unit, in practice it is found convenient to select the values of the resistors R18, R19, R20 and R21 such that with switch SA in the position shown the time interval may be adjusted from 10 milliseconds to one minute and with switch SA in the other positions to give predetermined time intervals of 1 minute, 3 minutes and 5 minutes. In order to secure substantial reliability of the time period detected by valve V4 it is convenient to extend the anode and cathodes through leads 34 and 38 to a voltage stabilised supply provided by a voltage stabiliser V5 (Fig. 5C) connected in series with a resistor R28 to a D.C. source. When the coil 30 of the dosing unit is energised from the internal supply from leads 44 and 45 it is convenient to provide a pilot light L5 (Fig. 5D) in parallel therewith to give a visual indication of the operation of the dosing unit and in order to protect the rise of voltage across the lamp L5 upon opening of the contacts G1 a surge-resisting rectifier 48 may conveniently be connected in parallel therewith. With reference to the magnets PMM and PMD forming part of relay P it is convenient to provide for alternative current draining resistors R16 and R17 (Fig. 5B) to be connected across leads 26 and 27 upon operation of contacts A1 and D1 respectively in order to avoid any undue rise in voltage, between leads 26 and 27 upon disconnection of the magnet PMM or PMD. A further pilot light L6 (Fig. 5D) in series with a resistor is connected in parallel with the coil of relay F and the lamps L3 and L6 to give a visual indication of whether the potentiometer is above or below balance position.

The electricity supplies required for the operation of the relays and the valves may conveniently be drawn from secondary windings of a transformer T1 (Fig. 5C). A first secondary winding 49 derives a low voltage supply for the pilot light L1 and L2 and is extended to a bridge rectifier 50 to deliver a low voltage D.C. supply on leads 23 and 24. The heaters of valves V2, V3 and V4 are extended to the secondary winding 49 of transformer T1 by leads 69, 70 in a conventional manner. A further secondary winding 51 which may provide a voltage in the region of 200 volts R.M.S. A.C. is extended to a bridge rectifier 52 to provide a D.C. supply between leads 24 and 25 and a stabilised voltage supply between leads 38 and 24. A still further secondary winding 53 is connected to a bridge rectifier unit 54 to supply a bias voltage supply between leads 24 and 28. A still further secondary winding 55 is connected to a bridge rectifier unit 56 to provide a direct current supply on leads 42 and 43 for the operation of relays B, E and F and for the motor M. Yet a further secondary winding 57 is extended through leads 58, 59 to a bridge rectifier 60 to provide a direct current supply on leads 44 and 45 for the operation of the magnet 30 of the dosing unit. A yet further secondary winding 61 is connected by leads 73 and 74 to a bridge rectifier unit 62 to provide a rectified supply on leads 26 and 27 for the operation of the magnets PMM and PMD. Reservoir condensers C6, C7, C8 and C9 are connected across the rectified outputs of rectifiers 52, 54, 56 and 62 respectively. The valve voltmeter comprising valves V1A and V1B (Fig. 5A) is preferably supplied by a separate transformer T2 having a secondary winding 63 for energising the heaters of valves V1A and V1B and a secondary winding 64 extended to a bridge rectifier 65 delivering a rectified supply to leads 66 and 67. This supply is preferably smoothed by a reservoir condenser C10, a series resistor R28 and a smoothing condenser C11 before being extended on leads 66 and 68 to the valves V1A and V1B. Leads 34 and 35 are also extended to the amplifier 6 which conveniently has its own self-contained power supply unit.

Figure 6 is a circuit diagram of one form of apparatus suitable for carrying out a potentiometric reaction or titration according to the curve of Fig. 3 and as illustrated in the block diagram of Fig. 4. Certain parts of the apparatus illustrated in the circuit diagram of Fig. 5 are also present in the circuit diagram of Fig. 6 and where possible like reference characters and reference numerals have been used. Switches SA, SB, SC, SD and SE perform the same functions in Fig. 6 as they do in Fig. 5. Switch SA (Fig. 6B) is associated with the grid circuit of valve V10A and serves to select a time interval. Switch SB has contacts SB1, SB2, SB3, SB4, SB5, SB6, SB7 and SB8 (all in Fig. 6A) and serves to cater for a reaction or titration in which the change in potential between the electrodes may be in either direction. Switch SC is the main control switch and contacts SC1 (Fig. 6D), SC2, SC3, and SC8 (Fig. 6A) perform the same functions in the apparatus of Fig. 6 as they did in that of Fig. 5. This switch however also includes additional contacts SC9 and SC10 (Fig. 6B) which are respectively in the cathode and grid circuits of valves V10A, V10B, V11A and V11B, contacts SC11 (Fig. 6D) in the circuit of the coil of relay G, contacts SC12 (Fig. 6B) in the anode circuit of valves V10A, V10B, V11A and V11B contacts SC13 (Fig. 6C) associated with the coil of relay AH contacts SC14 (Fig. 6C) in the circuit of the magnet PMD of relay P, and contacts SC15 (Fig. 6B) in the circuit of relays AG and AC. Switch SD is concerned with selecting the input to the valve voltmeter formed by the valves V1A and V1B and includes contacts SD1, SD2 and SD3 (Fig. 6A). Contacts SD1 and SD3 are in the circuits connecting with the grids of the triodes V1A and V1B whilst contacts SD2 pre-select a predetermined potential to be applied to the grid of the valve V1A. Whereas in the circuit diagram of Fig. 5 the switch SD has four positions in the circuit diagram of Fig. 6 it has five positions. In the first position of switch SD the grid of the left hand triode V1A is connected to the grid of the triode V1B so that there is no input to the valve voltmeter which can then be zeroized as previously described in connection with Fig. 5. In the second position of switch SD the input is extended by leads 39 and 71 to the voltage appearing between one end and the slider of the potentiometer R10 which is motor driven. In the third position the input is extended through leads 39 and 41 to apply the voltage existing across the manually adjusted backlash unit comprising the potentiometers R8 and R9 and the batteries Z1 and Z2. In the fourth position the input to the valve voltmeter is extended by leads 39 and 40 and is the voltage appearing across the whole of potentiometer R10. When switch SD is in the fifth position the grids of the valve V1A and V1B are connected to leads a and b which connect with the anodes of valves V6 and V7 (Fig. 6C) which as will be subsequently described form a differential valve voltmeter. When switch SD is in the first, second, third or fourth position, a pre-set voltage from potentiometer R5 of potential divider R4, R5 and R6 is applied to a control grid of the valve V1A but when the switch SD is in the fifth position the control grid of valve V1A is connected to the slider of a further potentiometer R30 is parallel with potentiometer R5 for a purpose hereinafter described.

The output of the amplifier 6 (Fig. 6A) is extended through switch contacts SB1 and SB2 to the coil of relay P which is of the same type as that hereinbefore described in connection with the circuit diagram of Fig. 5. In addition the output leads are extended through the leads marked X and Y to the control grid circuits of valves V6 and V7 (Fig. 6C). One side of the output on lead X is applied to the control grid of the pentode valve V6 whilst the other side of the output is extended by lead Y to one side of a condenser C12 the other side of which is connected to the control grid of the valve V7. A rectified D.C. output delivered by rectifier 52 (Fig. 6D) connected to secondary winding 51 of transformer T1 is extended by leads 25 and 26 and stabiliser V9 in series with resistor R31 to provide a stabilised rectified D.C. supply between leads 26 and 72. The cathodes of valves V6 and V7 (Fig. 6C) are connected to lead 26 through a common cathode resistor R32 and the anode of V6 is connected to the anode of V7 through a fixed resistor R33, a potentiometer R34 and a potentiometer R35. The slider of potentiometer R34 connects with lead 72, and a potential divider formed by potentiometers R36 and R37 provides a pre-set voltage supply for the screen grids of valves V6 and V7 and a bias supply to the control grid of valve V7 through condenser C12. A testing valve V8 (Fig. 6C) is associated with the anode circuits of valves V6 and V7 and the cathode of the valve V8 is connected to the slider of the potentiometer R35 in the anode circuit of valve V7 whilst the control grid is connected to the anode of valve V6, a condenser C13 being connected between the control grid and earth. The cathode of valve V8 is extended to lead 24 between which and lead 28 there appears a rectified D.C. potential from rectifier 54 (Fig. 6D) connected to secondary winding 53 of transformer T1. In the anode circuit of valve V8 (Fig. 6C) is the coil of relay AH in series with an indicating milliammeter. As will be herein described valves V6 and V7 serve to compare successive changes in potential arising between the electrodes 21 and 22, and valve V8 serves to test whether a change is greater or less than the immediately preceding change.

It is believed that the operation of the circuit can best be described with reference to the circumstances which arise on the movement of the main control switch SC into its successive positions. Switch SC is indicated in Fig. 6 as in the first or off position. When switch SC is moved to its second positions mains supply through leads 36 and 37 (Fig. 6D) is extended to the primary winding of transformer T1 and through leads 34 and 35 to that of transformer T2 and to the amplifier 6. The valve heaters warm up and the pilot light L1 is illuminated to indicate that the apparatus is switched on. The valves V10A, V10B, V11A, V11B are inoperative at this stage and the coil of relay P is short circuited by switch contacts SC8. As previously described in connection with the circuit diagram of Fig. 5 the valve voltmeter formed by valves V1A and V1B can now be employed and is first zeroized by operation of the potentiometer R1. If switch SD (Fig. 6A) is moved into the second position the voltage appearing between one end and the slider of potentiometer R10 can be observed and when switch SD is switched into the third position the voltage injected into the electrode circuit by the manual adjustment unit can be set by manual operation of the potentiometers R10 and R9, to give a set predetermined indication on the millivolt meter 31 which indication may conveniently correspond to 100 millivolts. When switch SD is turned to the fourth position the input voltage to the valve voltmeter is the potential existing across the whole of the potentiometer R10 and this may be adjusted by means of resistor R11 to a desired value, to give for example a full scale indication of 1100 millivolts on meter 31.

Switch SD is then turned to the fifth position in which the input circuit of the valve voltmeter is extended to the anodes of valves V6 and V7. It will be noted that when switch SD is in the first, second, third or fourth positions the grid of the valve V1B is connected to the grid of the triode V1A through resistor R7 but when switch SD is in the fifth position the grid of valve V1B is connected through resistor R7 and switch contacts SD2 to the slider of potentiometer R30 whilst the grid of valve V1A is connected to the slider of potentiometer R5. The potentiometer R5 is pre-set to apply a predetermined voltage to the control grid for normal operation and the slider of potentiometer R30 is pre-set in relation to the slider of the potentiometer R5 to inject a predetermined potential difference into the circuit between the control grid of valve V1B and the control grid of valve V1A. The effect of this is to produce an approximately mid-scale deflection of the millivolt meter 31 and thereby transform the valve voltmeter into a centre zero meter. When switch SD is in the fifth position the signal applied to the valve voltmeter is the voltage difference between the anodes of valves V6 and V7. With relay AG released the control grid of V6 is connected through contacts AG2 to the control grid of V7 and the potentiometer R34 is adjusted to produce substantially no difference in potential between the anodes of valves V6 and V7.

The electrodes 21 and 22 can now be inserted in the reaction vessel and switch SC moved to the third position, when the motor M will be energised to drive the potentiometer R10 in order to compensate for any potential then existing between the electrodes. If the potential between the electrodes is such that a positive signal is applied to the input of amplifier 6, the output from the amplifier applied to the coil of relay P will cause the moving element thereof to be deflected in a direction to close contacts PM. Contacts PM reduce the bias applied to the control grid of valve V2 which then conducts and relay A operates. Contacts A1 (Fig. 6C) disconnect the magnet PMM to cause the release of contacts PM and the subsequent release of relay A which pulses in the manner hereinbefore described. Upon operation of relay A contacts A4 (Fig. 6B) complete a circuit from lead 43 through switch contacts 15 and contacts D12 for the operation of motor M which then drives the potentiometer R10 in a direction to reduce the voltage applied to the input of the amplifier 6. As the slider of the potentiometer R10 approaches the balancing position the magnitude of the signal applied to the coil of relay P diminishes and the rate of pulsing of contacts PM and relay A diminishes until no further operation takes place. The lamp L4 (Fig. 6B) is connected in parallel with the motor M and pulses with operation of relay A so that extinguishment of the light L4 indicates that the balancing position of potentiometer R10 has been achieved. If, however, initially the setting of the potentiometer R10 is such that a negative signal is applied to the input of amplifier 6 the coil of relay P is energised in the reverse direction by the output of the amplifier 6 and the moving element is deflected in the reverse direction to cause contacts PD to close under the influence of the magnet PMD. Closure of contacts PD (Fig. 6C) reduces the bias applied to the grid of valve V3 causing relay D to operate. Upon operation of relay D contacts D1 (Fig. 6C) disconnect the circuit of magnet PMD to cause contacts PD to open, valve V3 to be biased back, and relay D to release, thereby enabling relay D to pulse in the manner previously described. Upon operation of relay D contacts D2 (Fig. 6B) complete a circuit from lead 43 through switch contacts SC15 and contacts A4 to lead 42 for operation of motor M in the reverse direction to drive the slider of the potentiometer R10 in a direction towards balance and the motor will be pulsed until the magnitude of the signal applied to the input of the amplifier 6 is insufficient to cause sufficient deflection of the moving element of relay P as would be required to cause closure of contacts PD. When the initial balancing has been effected switch SC may be turned to the fourth or operate position.

In the fourth position switch contacts SC14 (Fig. 6C) disconnect the magnet PMD, contacts SC9, SC10 and SC12 (Fig. 6B) respectively extend lead 26 to the cathode circuit of valves V10A, V10B, V11A and V11B, a bias supply from lead 27 for the grid circuits of these valves, and an anode supply from lead 38 for these valves. Switch contacts SC15 disconnect lead 43 from the connection to the circuit of motor M and provide a circuit for the operation of relays AC and AG. Switch contacts SC11 (Fig. 6D) prepare a circuit for the operation of relay G and switch contacts SC13 (Fig. 6C) prepare a holding circuit for relay AH.

As initially at this stage relays AK, A and AC are released the bias voltage on lead 27 is not applied to the control grid of valve V11B (Fig. 6B) which therefore conducts and relay AK operates. Contacts AK3 (Fig. 6B) connect condenser C14 to the operating coil of relay G and contacts G1 extend a supply from leads 44 and 45 (or from leads 46 and 47 dependent upon the position of switch SE) to the operating coil 30 of the dosing unit which therefore operates to permit a quantity of reagent or titrating agent to be introduced into the reaction vessel. Contacts AK1 (Fig. 6B) connect lead 27 to the grid circuit of valve V11B through resistor R38, and a negative charge builds up in condenser C15 so that after a short time interval valve V11B is biased back and relay AK releases. On release of relay AK condenser C14 (Fig. 6D) is disconnected from the coil of relay G and is reconnected to a DC supply on lead 28 through charging resistor R39; contacts AK1 (Fig. 6B) disconnect the condenser C15 from the bias supply on lead 27. Condenser C15 discharges through resistor R40 and in due course the bias on the control grid of valve V11B is reduced and relay AK re-operates. This sequence is repeated and with each operation of relay AK the operating magnet 30 of the dosing unit is energised and a quantity of reagent introduced into the reaction vessel. It will be noted that at this stage contacts AK2 (Fig. 6B) are ineffective as relay AG is released and contacts AK4 are ineffective as relay AF is released.

The procedure of a timed succession of doses of reagent continues until the voltage between the electrodes 21 and 22 rises sufficiently to cause the amplifier 6 to deliver a sufficient signal to the coil of relay P to cause contacts PM to be closed under the influence of magnet PMM. Contacts PM (Fig. 6C) reduce the bias on valve V2 and relay A is operated. Relay A disconnects the circuit to magnets PMM through contacts A1 (Fig. 6C) and through contacts A2 (Fig. 6B) applies the bias supply on lead 27 directly to the control grid on valve V11B, biassing it back and thereby releasing relay AK. Contacts A3 (Fig. 6B) complete a circuit from lead 42 through contacts AG3, contacts AF1 and switch contacts SC15 to lead 43 for the operation of relay AC. Contacts A4 (Fig. 6B) are ineffective at this stage. Upon opeartion of relay AC, contacts AC1 (Fig. 6B) complete a holding circuit for relay AC through resistor R41 connecting with lead 42. Contacts AC2 continue to connect the bias supply on lead 27 to the grid of valve V11B. Contacts AC3 (Fig. 6C) disconnect the circuit to magnet PMM against the possible release of relay A thereby rendering the relay P ineffective as contacts PM are unable to be closed in the absence of energisation of the magnet PMM. Contacts AC4 (Fig. 6B) disconnect the bias supply on lead 27 from the grid circuit of valve V10A. This bias supply has hitherto charged condenser C16 and this now discharges one or more of resistors R41, R42, R43, and R44 dependent upon the position of switch SA. After an appropriate time interval, the bias voltage on the grid of valve V10A is reduced to a value at which the valve conducts at an extent sufficient to cause relay AD to operate. This time interval serves for the purpose of enabling conditions in the reaction vessel to become stabilised and may be pre-selected by operation of switch SA. For example the values of the resistors R41, R42, R43 and R44 in relation to the capacitance of the condenser C16 may be such as to provide for predetermined time intervals of a half-minute, one minute, three minutes and five minutes.

When relay AD operates contacts AD1 (Fig. 6C) complete a circuit from line 28 through the milliammeter and the coil of relay AH to the anode of valve V8 but since at this time relay AG is released the control grids of valves V6 and V7 are connected to one another no input signal is applied to the grid of the cathode circuit of valve V8. Contacts AD2 (Fig. 6B) disconnect the control grid of valve V10B from the bias supply on lead S27 and a condenser C17 which has been charged by this bias supply discharges through resistor R45. When condenser C17 has discharged sufficiently the bias on valve V10B is reduced and relay AE operates. Contacts AE2 (Fig. 6B) connect the grid of the valve V6 to the grid of the valve V7, against the operation and subsequent locking of relay AG, contacts AE3 (Fig. 6B) reconnect the bias on lead 27 to the grid of valve V10A to bring about the release of relay AD, contacts AE4 disconnect the grid of valve V11A from the bias supply on lead 27 so that condenser C18 which has previously been charged by this supply now discharges through resistor R46. Contacts AE1 (Fig. 6B) complete an operate circuit from lead 42 through contacts AH2 and switch contacts SC15 to lead 43 for the operation of relay AG. Upon the operation of relay AG contacts AG1 (Fig. 6B) complete a holding circuit for relay AG through resistor R47 and contacts AH2 and contacts AG2 (Fig. 6B) disconnect the grid of valve V6 from the grid of valve V7 though these are for the moment connected to one another through contacts AE2. Upon the release of relay AD contacts AD1 disconnect the anode circuit of valve V8 and contacts AD2 are ineffective. When condenser C18 has discharged sufficiently through resistor R46 the bias on the control grid of valve V11A is reduced to cause relay AF to operate. On operation of relay AF contacts AF1 (Fig. 6B) disconnect relay AC from lead 43 and relay AC thereupon releases, and contacts AF1 also extend a circuit from lead 43 to the circuit of motor M in preparation for its subsequent operation. Contacts AF2 (Fig. 6B) connect the bias supply on lead 27 once more to the control grid of valve V10B which thereupon causes relay AE to release. Upon the release of relay AC contacts AC1 are ineffective, contacts AC2 disconnect the bias supply on lead 27 from the control grid circuit of valve V11B, contacts AC3 (Fig. 6C) restore the circuit to magnet PMM of relay P in preparation for the re-closing of contacts PM and contacts AC4 reconnect the bias supply on lead 27 to the control grid of valve V10A against the release of relay AD. When relay AE releases contacts AE1 are ineffective but contacts AE2 disconnect the grid of valve V6 from the grid of valve V7.

Prior to the release of relay AE the potential applied to the coil of relay P has been present between the leads X and Y and condenser C12 in the grid circuit of valve V7 will have been charged to this potential. When relay AE releases this condenser C12 remains charged to this potential. Upon the release of relay AC the bias supply from lead 27 was disconnected from the grid condenser C15 of valve V11B, and after a time interval condenser C15 will have discharged through resistor R40 to an extent sufficient to cause valve V11B to re-conduct sufficiently to re-operate relay AK. However, before relay AK re-operates the relay P will have been able to re-operate since contacts AC3 restored the circuit to the magnet PMM. Upon the closure of contacts PM, the bias on valve V2 is reduced and relay A (Fig. 6A) operates. Upon operation of relay A contacts A1 (Fig. 6B) disconnect the circuit to the magnet PMM to bring about pulsing of contacts PM as hereinbefore described. Contacts A2 re-apply the bias supply from lead 27 to the grid circuit of valve V11B and at this stage contacts A3 (Fig. 6B) are ineffective as relay AG is operated. Contacts A4 however provide a circuit for the motor M from lead 43 through switch contacts SC15, relay contacts A4 and D2 to line 42 and upon pulsing of relay A the motor M drives the potentiometer R10 in a direction to restore the balance and reduce the input signal to the amplifier 6.

The pulsing of relay A continues until the potential applied to the input terminals of amplifier 6 is insufficient to cause relay P to operate and close contacts PM. Under these conditions relay A remains released and contacts A2 disconnect the bias supply on lead 27 from the grid circuit of valve V11B. When condenser C15 has discharged through resistor R40 sufficiently relay AK re-operates, contacts AK (Fig. 6B) reconnect the bias supply on lead 27 to condenser C15 through resistor R38 and contacts AK3 (Fig. 6D) connect condenser C14 to the coil of relay G, relay G operates and contacts G1 complete the circuit to the operating coil 30 of the dosing unit and a further quantity of reagent of titrating agent is introduced into the reaction vessel.

After a short time interval, condenser C15 receives a negative charge and relay AK releases. Contacts AK2 (Fig. 6B) are ineffective at this stage but contacts AK4 connect the bias supply on lead 27 through resistor R48 and contacts AE4 to the condenser C18 in the grid circuit of valve V11A, so that after a short time interval relay AF releases. The condenser C18 in the grid circuit of V11A receives a sufficient negative charge quicker than does the condenser C15 in the grid circuit of valve V11B so that relay AF releases before relay AK. Upon the release of relay AF contacts AF1 (Fig. 6B) complete a circuit from lead 43, through switch contacts SC15 and contacts AK2 and contacts AG3 to lead 42 for the re-operation of relay AC. Upon the re-operation of relay AC contacts AC1 (Fig. 6B) complete a holding circuit for relay AC, contacts AC2 re-apply the bias supply to the grid valve V11B to cause relay AK to release, contacts AC3 disconnect the magnet PMM of relay P thereby preventing the operation of contacts PM and contacts AC4 disconnect the bias supply from the grid circuit of valve V10A.

After a time interval determined by the grid circuit of valve V10A relay AD operates but before this occurs the addition of further reagent or titrating agent to the reaction vessel will have caused a rise in potential between the electrodes and this rise in potential will have been conveyed to the input of amplifier 6 so that a positive output signal will be applied to the coil of relay P (Fig. 6A) and to leads X and Y (Figs. 6A and 6C). The potential applied to the control grid of valve V6 in relation to that applied by condenser C12 to the control grid of valve V7 will be dependent on the magnitude of the voltage applied by the amplifier 6 to the coil of relay P. Upon operation of relay AD which will not occur until a predetermined time interval has elapsed such time interval providing for the stabilisation of conditions in the reaction vessel, contacts AD1 (Fig. 6B) complete the anode circuit to valve V8. The grid to cathode potential now applied to valve V8 depends upon the relative potential of the control grids of valves V6 and V7. If the extent of the potential now applied to the control grid of V6 is greater than the potential previously applied to the condenser V12 (which it will be recalled was the extent of the signal applied to the coil of relay P after the addition of the previous quantity of reagent to the reaction vessel), the potential of the control grid of V6 relatively to that of V7 will be greater. Valve V6 will draw a larger anode current than valve V7 and the potential drop between the slider of potentiometer R34 and the anode of V6 will be greater than the drop between the slider and the anode V7. Thus, a more negative potential is applied to the grid of valve V8 which does not conduct sufficiently to operate relay AH. If, however, the potential now applied to the control grid of valve V6 were less than that applied to the control grid of valve V7 by condenser C12 a less negative potential would be applied to the grid of valve V8 relatively to its cathode and V8 would conduct sufficiently to cause operation of relay AH. Thus, valves V6 and V7 in combination with valve V8 serve to compare the extent of change of electrode potential brought about by the addition of one quantity of reagent with the change in potential brought about by the addition of the immediately preceding quantity of reagent and thus serve as a differential analyser.

Let it be assumed that the extent of the potential now appearing between leads X and Y is equal to or greater than that to which condenser C12 has been charged. Under these conditions the end-point of the reaction has not been reached and relay AH does not operate. The operation of relay AD, in addition to contacts AD1 completing the anode circuit of valve V8, contacts AD2 disconnected the bias supply from lead 27 to the condenser C17 in the grid circuit of valve V10B. After a short time interval relay AE operates. Contacts AE1 (Fig. 6B) are ineffective as relay AG is operated and held but contacts AE2 connect the grid of the valve V6 to the control grid of the valve V7 so that the condenser C12 now becomes charged to the potential existing between leads X and Y. The effect of this is that the magnitude of the change as indicated by the output of the amplifier 6 has become stored in condenser C12. The operation of relay AE prepares for the operation of relay AF and for the release of relay AD. The operation of relay AF releases relay AC through contacts AF1. Through contacts AC3 the release of relay AC prepares for the pulsing of relay P to effect operation of the motor M to drive the potentiometer R10 to a fresh balancing position until no further operation of contacts PM arises in the same manner as that hereinbefore described. When the potentiometer R10 has been driven to a fresh balancing position relay AK re-operates as hereinbefore described and relay G completes a circuit for the operation of the dosing unit to deliver a further quantity of reagent or titrating agent into the reaction vessel. The operation of relay AC initiates the cycle of the operation of relays AD, AE, AF and AK and AC as before and with each operation of relay AD the valve V8 is rendered operative to determine whether the change in electrode potential brought about by the last addition of a quantity of reagent or titrating agent to the reaction vessel has been greater or less than its immediately preceding change.

If it is now assumed that the extent of the change of electrode potential occasioned by the last additional quantity of reagent or titrating agent added to the reaction vessel is less than the immediately preceding change upon closure of contacts AD1 on operation of relay AD valve V8 will be caused to conduct to an extent sufficient to bring about the operation of relay AH indicating that the end of the titration has been reached. Contacts AH1 (Fig. 6B) complete a holding circuit for the relay AH through resistor R49 and switch contacts SC13 connecting with lead 24. Contacts AH2 disconnect a circuit for relay AG which thereupon releases and contacts AH2 complete a circuit from lead 42 and lead 43 to switch contact SC15 for lamp L2 which is illuminated to indicate that the end-point has been reached. Contacts AH3 (Fig. 6D) disconnect condenser C19 from a charging circuit through resistor R39 and connect to a bell 29 which rings to give an audible indication that the end-point has been reached. Contacts AH4 (Fig. 6B) disconnect the anode circuits of valves V10A, V10B, V11A and V11B thereby releasing relays AD, AE and AF and preventing the re-operation of relay AK which would bring about the addition of a further dose of reagent.

In operation of the apparatus embodying the circuit diagram of Fig. 6 it will be noted that the end-point of the reaction is actually determined by valve V8 and operation of relay AH when a drop or quantity of reagent or titrating agent over and above that required to reach the end-point has been added, since the valve V8 only becomes operative to operate relay AH when the change of voltage at the electrode is determined as being less than that which obtained after the addition of the previous quantity of reagent or titrating agent. The quantity of reagent or titrating agent added to the reaction vessel can, if desired, be counted by the provision of an electro-magnetic counter in parallel with the operating magnet 30 of the dosing unit and for many purposes this may provide sufficient indication, although it should be noted that the quantity of reagent indicated by such a counter would be one unit or dose more than that required to reach the end-point. If greater accuracy is required a mechanical metering pump may be employed for the delivery of reagent or titrating agent to the reaction vessel so that upon each energisation or operation a substantially predetermined and metered quantity of reagent or titrating agent is introduced to the reaction vessel.

If it is desired to adjust the sensitivity of the detecting circuit of valve V8 push button PBT may be operated manually prior to the initiation of a reaction or titration. The contacts of push button PBT are connected in parallel with contacts AD1 and thus can complete the anode circuit of valve V8. A milliammeter is provided in series with the operating coil of relay AH and the sensitivity of the detector circuit of valve V8 can be adjusted by manual operation of the slider of potentiometer R35 so as to control the initial grid to cathode voltage applied to valve V8 when the control grids of valve V6 and V7 are connected together, for example through contact AG2. If the operating current of relay AH is known the potentiometer R35 may be adjusted until the current flowing in the anode circuit of valve V8 is a desired extent below the minimum operating current of the relay AH.

It will be noted that at the commencement of a reaction or titration, the reagent or titrating agent is normally added to the reacion vessel drop by drop through the pulsing operation of the dose unit and this operation continues until a rise in voltage at the electrodes is detected by the operation of relay P to close contacts PM. If for a particular reaction or titration it is known that a relatively large quantity of reagent or titrating agent must be added to the reaction vessel before any substantial rise of potential will occur it is possible to reduce the time required for the introduction of such quantity by initially setting the manually adjustable backlash votage unit formed by batteries Z1 and Z2 and potentiometers R8 and R9 to inject into the electrode circuit a negative voltage, that is to say, a voltage of opposite polarity to that which will subsequently arise between the electrodes. Since closure of contacts PD of relay P is dependent upon energisation of magnet PMD in addition to the energisation of the coil of relay P, by connecting magnet PMD through switch contacts SC14 only when SC is in its third position it is possible to render contacts PD inoperative when the switch SC is in the fourth position corresponding to the actual execution of a reaction or titration. Thus relay P during the run of a reaction can be rendered non-responsive to a negative output signal from amplifier 6 thereby enabling relay AK to pulse continuously until a rise in potential of a predetermined amount as determined by the setting of the manually adjusted backlash voltage unit has been overcome and a positive signal applied to the input of amplifier 6 to give a positive signal from its output to bring about the operation of relay P to close contacts PM.

We claim:

1. A control system for automatic control of chemical reactions utilising the change of potential across electrodes disposed within the reaction system independently of the absolute potential existing across said electrodes, comprising dosing means for delivering a predetermined quantity of reactant to the reaction system, compensating means for balancing the potential change which occurs at the electrodes after delivery of each quantity of reactant to the reaction system, control means responsive to the change in potential at the electrodes for operating said compensating means, control means responsive to the change in potential at the electrodes for operating said dosing means after the operation of said compensating means, and end-point indicating means responsive to the differential coefficient of the potential across the electrodes for stopping further operation of the apparatus when the reaction has been completed.

2. A control system as claimed in claim 1 in which the control means for operating said compensating means comprises an amplifier connected to said electrodes and feeding an amplified potential to a differential relay responsive to said amplified potential and pulsing means responsive to signals from said differential relay for generating and feeding operating pulses to said compensating means.

3. A control system as claimed in claim 2 in which the compensating means comprises a motor potentiometer connected between said electrodes and said amplifier, said motor potentiometer being driven by a motor which is responsive to operating signals received from said pulsing means.

4. A control system as claimed in claim 1 in which said compensating means includes a manually operated backlash potentiometer for initial rough balancing of the potential at the electrodes before the reaction is started.

5. A control system for automatic control of chemical reactions utilising the change of potential across electrodes disposed within the reaction system independently of the absolute potential existing across said electrodes, comprising dosing means for delivering a predetermined quantity of reactant to the reaction system, compensating means for balancing the potential change which occurs at the electrodes after delivery of each quantity of reactant to the reaction system, first control means for operating said compensating means and responsive to an operating signal from a direction sensitive means, second control means for operating said doser means and responsive to an operating signal from a direction sensitive means, direction sensitive means responsive to changes in the potential across said electrodes and actuating the first control means when the potential changes in one direction and actuating the second control means when the potential changes in the reverse direction, and end-point indicating means which operates to stop further operation of the apparatus when after changing in one direction, the potential at the electrodes no longer changes in the reverse direction.

6. In or for chemical reaction control systems the combination comprising a pair of electrodes responsive to a potential developed in a reaction vessel, a potentiometer connected in a series circuit with said electrodes, a motor for driving said potentiometer, reactant addition controlling means for adding predetermined quantities of reactant to said reaction vessel, first switching means responsive to a change in potential across said series circuit in one direction occasioned by the change in potential across said electrodes in one direction, second switching means responsive to a change in potential across said series circuit in a reverse direction occasioned by a change in potential across said electrodes in the direction opposite to said second mentioned one direction, said first switching means controlling said motor to drive said potentiometer to reduce said change in said potential across said series circuit in said one direction, said second switching means controlling said reactant addition controlling means, and indicating means for measuring the time interval between successive operations of said second switching means and indicating when said time interval exceeds a predetermined value.

7. In or for chemical reaction control systems, the combination comprising a pair of electrodes responsive to a potential developed in a reaction vessel, a potentiometer connected in a series circuit with said electrodes, a motor for driving said potentiometer, reactant addition controlling means for adding predetermined quantities of reactant to said reaction vessel, first switching means responsive to a change in potential across said series circuit in one direction occasioned by the change in potential across said electrodes in one direction, second switching means responsive to a change in potential across said series circuit in a reverse direction occasioned by a change in potential across said electrodes in the direction opposite to said second mentioned one direction, said first switching means controlling said motor to drive said potentiometer to reduce said change in said potential across said series circuit in said one direction, said second switching means controlling said reactant addition controlling means, and time responsive means initiated and re-set by each operation of said second switching means and rendering said second switching means inoperative after the lapse of a predetermined time from the last operation of said switching means.

8. The combination according to claim 7 including manually operable switching means for rendering said first switching means inoperative to control said motor subsequent to the completion of one reaction in said reaction vessel whereby to permit a repeat reaction under substantially identical conditions to be performed.

9. In or for a chemical reaction control system an analyser comprising the combination of: a pair of electrodes in a reaction vessel: an amplifier: a potentiometer connected in series with said electrodes to said amplifier: a motor for driving said potentiometer: relay means responsive to the output of said amplifier: means for controlling the periodic addition of predetermined quantities of reactant to said reaction vessel: potential storage means: a differential valve voltmeter having a first input and a second input: first, and second and third switching means, said first switching means connecting said first input to the output of said amplifier, said second input to said storage means and rendering said valve voltmeter operative to compare the output of said amplifier with the potential in said storage means, said second switching means connecting the output of said amplifier to said storage means to charge said storage means to a potential indicative of the then obtaining output of the amplifier: said third switching means being responsive to said relay means for controlling said motor to cause it to drive said potentiometer to balance the potential between the electrodes and render said amplifier responsive only to a subsequent change in potential between the electrodes: time responsive means for rendering operative in succession said first switching means, said second switching means, said third switching means and reactant addition controlling means, and initiated when said reactant addition controlling means is operated: detecting means responsive to the output of said differential valve voltmeter when the output of the said amplifier in response to a subsequent change in potential between the electrodes differs in a given manner from the output of the amplifier in response to the immediately preceding change in potential between the electrodes as stored in said storage means.

References Cited in the file of this patent

UNITED STATES PATENTS

| | | |
|---|---|---|
| 2,770,531 | Hawes et al. | Nov. 13, 1956 |
| 2,831,942 | Dreyer et al. | Apr. 22, 1958 |